United States Patent
Seko et al.

(10) Patent No.: US 12,026,424 B2
(45) Date of Patent: Jul. 2, 2024

(54) APPARATUS FOR DISPLAYING INFORMATION SUPERIMPOSED ON MIRROR IMAGE, DISPLAYING APPARATUS, AND DISPLAYING PROGRAM

(71) Applicant: Nippon Telegraph and Telephone Corporation, Tokyo (JP)

(72) Inventors: Shunichi Seko, Musashino (JP); Yoshiki Nishikawa, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 58 days.

(21) Appl. No.: 17/801,546

(22) PCT Filed: Feb. 26, 2020

(86) PCT No.: PCT/JP2020/007849
§ 371 (c)(1),
(2) Date: Aug. 23, 2022

(87) PCT Pub. No.: WO2021/171442
PCT Pub. Date: Feb. 9, 2021

(65) Prior Publication Data
US 2023/0137237 A1    May 4, 2023

(51) Int. Cl.
*G06F 3/147*  (2006.01)
*G02B 27/14*  (2006.01)
*G06T 3/40*   (2024.01)
*G06T 7/30*   (2017.01)
*G06T 7/70*   (2017.01)
*G06T 19/00*  (2011.01)

(52) U.S. Cl.
CPC .......... *G06F 3/147* (2013.01); *G02B 27/144* (2013.01); *G06T 7/30* (2017.01); *G06T 3/40* (2013.01); *G06T 7/70* (2017.01); *G06T 19/006* (2013.01); *G06T 2207/20081* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 9,122,320 B1* | 9/2015 | Rowles | G06F 3/0317 |
| 2016/0284132 A1* | 9/2016 | Kim | G06F 3/011 |
| 2016/0292917 A1* | 10/2016 | Dorner | G02B 27/01 |
| 2017/0053456 A1* | 2/2017 | Cho | G06F 1/163 |
| 2018/0373330 A1* | 12/2018 | Benford | G06V 10/25 |
| 2019/0174093 A1* | 6/2019 | Kimura | G02B 5/32 |
| 2019/0251749 A1* | 8/2019 | Rhodes, Jr. | G06T 19/20 |
| 2020/0078640 A1* | 3/2020 | Putnam | A61B 5/1128 |
| 2021/0217242 A1* | 7/2021 | Hunter | G06T 7/50 |

FOREIGN PATENT DOCUMENTS

| | | |
|---|---|---|
| JP | 2011077747 | 4/2011 |
| JP | 2013246184 | 12/2013 |

\* cited by examiner

Primary Examiner — Jeffrey J Chow
(74) Attorney, Agent, or Firm — Fish & Richardson P.C.

(57) ABSTRACT

A display apparatus includes a half mirror configured to form a mirror image of an object existing in space in front of the half mirror; a display placed behind the half mirror; and overlay image generating means for generating an overlay image to be displayed by the display in a size appropriate for the mirror image at a position appropriate for the mirror image.

13 Claims, 27 Drawing Sheets

Fig. 5

| ID | NAME | GENRE-TO-BE-SUPERIMPOSED | SUPERIMPOSITION AREA | OVERLAY TEXT | OVERLAY IMAGE |
|---|---|---|---|---|---|
| 1 | HEADPHONE | HUMAN BEING | EARS TO UPPER HEAD | – | headphone.jpg |
| 2 | TOOTHBRUSH | HUMAN BEING | TEETH | – | toothbrush.jpg |

```
CAMERA:
    HORIZONTAL VIEWING ANGLE: 80
    VERTICAL VIEWING ANGLE: 40
HALF MIRROR:
    WIDTH: 90
    HEIGHT: 180
```

| ID | DATE/TIME | CORRECTION GENRE | CORRECTION DETAILS | SIMILARITY DISTANCE |
|---|---|---|---|---|
| 1 | 2019.12.10 12:34:56.789 | SIZE | ENLARGE (X1.1) | 10 |
| 2 | 2019.12.10 12:34:57.890 | SIZE | SHRINK (X0.95) | 5 |
| 3 | 2019.12.10 12:34:58.901 | POSITION | POSITIVE X DIRECTION (+3) | 23 |
| 4 | 2019.12.10 12:34:59.012 | POSITION | NEGATIVE Y DIRECTION (-5) | |

⋮

APPARATUS FOR DISPLAYING INFORMATION SUPERIMPOSED ON MIRROR IMAGE, DISPLAYING APPARATUS, AND DISPLAYING PROGRAM

CROSS-REFERENCE TO RELATED APPLICATIONS

This application is a National Stage application under 35 U.S.C. § 371 of International Application No. PCT/JP2020/007849, having an International Filing Date of Feb. 26, 2020. The disclosure of the prior application is considered part of the disclosure of this application, and is incorporated by reference in its entirety into this application.

TECHNICAL FIELD

The present invention relates to a display apparatus, display method, and display program that displays a mirror image by superimposing information on the mirror image.

BACKGROUND ART

Patent Literature 1 discloses a display apparatus that displays information suitable for an object by superimposing the information on the object such that the information can be seen.

CITATION LIST

Patent Literature

Patent Literature 1: Japanese Patent Laid-Open No. 2011-77747

SUMMARY OF THE INVENTION

Technical Problem

On such a display apparatus, an object in a camera picture and a mirror image of the object may not match in size. In this case, an overlay image does not match the mirror image of the object in size and position, which may result in unnatural superimposition.

The present invention has been made in view of the above circumstances and provides a technique for displaying an overlay image of a size appropriate for a mirror image of an object at a position appropriate for the mirror image.

Means for Solving the Problem

A display apparatus according to the present invention comprises: a half mirror configured to form a mirror image of an object existing in space in front of the half mirror; a display placed behind the half mirror; and overlay image generating means for generating an overlay image to be displayed by the display in a size appropriate for the mirror image at a position appropriate for the mirror image.

Effects of the Invention

The present invention provides a technique for displaying an overlay image of a size appropriate for a mirror image of an object at a position appropriate for the mirror image.

BRIEF DESCRIPTION OF DRAWINGS

FIG. 5 is a diagram showing the superimposition information DB shown in FIG. 2.

FIG. 6 is a diagram showing the hardware information shown in FIG. 2.

FIG. 16 is a diagram showing the correction history information DB shown in FIG. 15.

DESCRIPTION OF EMBODIMENTS

Embodiments of the present invention will be described below with reference to the accompanying drawings. An apparatus according to each of the embodiments is a display apparatus that displays a mirror image by superimposing information on the mirror image. A user of the display apparatus can see not only his/her own mirror image, but also information superposed on the mirror image. Such a display apparatus is known, for example, as a smart mirror.

First Embodiment

Figure 1:
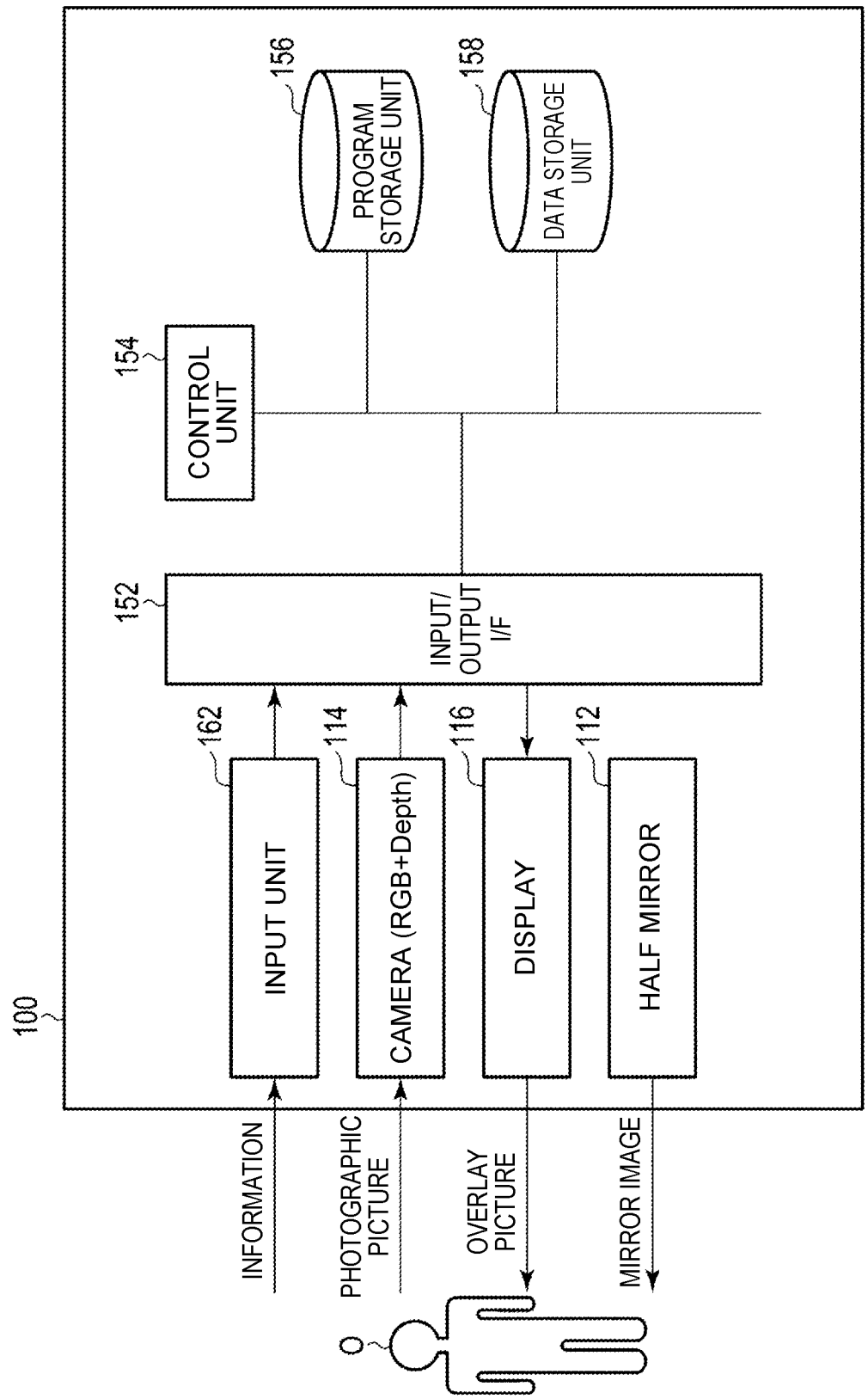
FIG. 1 is a block diagram showing a hardware configuration of a display apparatus according to a first embodiment of the present invention.

As shown in FIG. 1, a display apparatus 100 according to the present embodiment includes a half mirror 112, a camera 114, and a display 116, as hardware.

Figure 3:
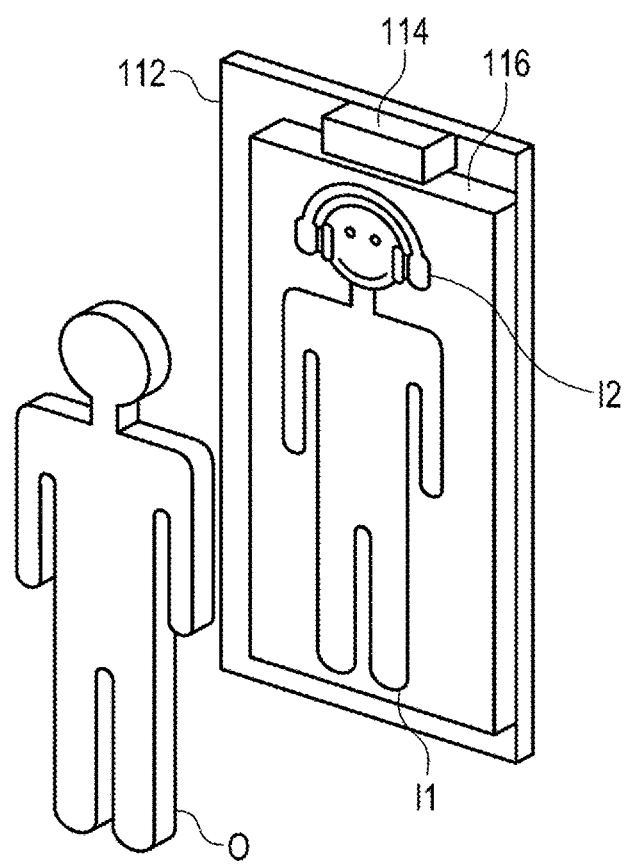
FIG. 3 is a perspective view of the half mirror, display, and camera shown in FIGS. 1 and 2.
Figure 4:
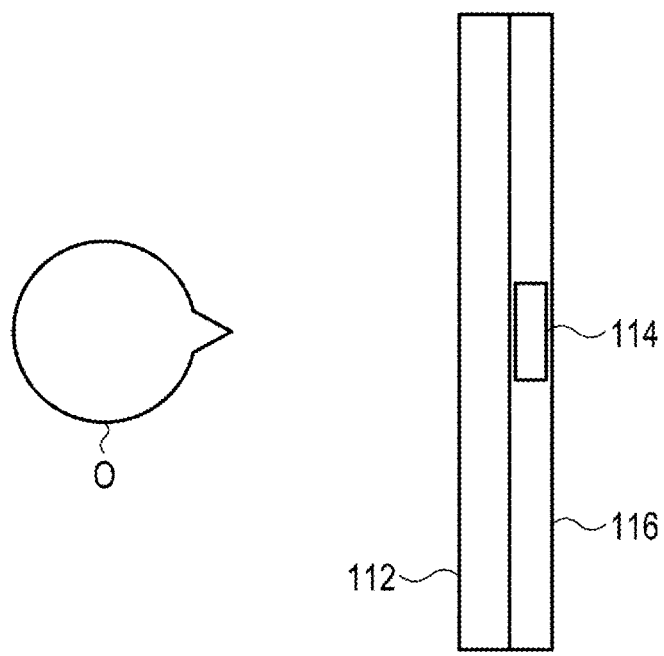
FIG. 4 is a top view of the half mirror, display, and camera shown in FIGS. 1 and 2.

As shown in FIGS. 3 and 4, the camera 114 and the display 116 are placed on top of the half mirror 112. Hereinafter, that side of the half mirror 112 on which the camera 114 and the display 116 are located will be designated as the rear side and the opposite side will be designated as the front side. Thus, a user O of the display apparatus 100 is located in front of the display apparatus 100. The display 116 is a size smaller than the half mirror 112. The camera 114 is placed on the upper side of the display 116.

The half mirror 112 partially reflects light coming from in front of the half mirror 112. Consequently, a mirror image of an object existing in space in front of the half mirror 112 is formed on a surface of the half mirror 112. For example, a mirror image I1 of the user O located in front of the display apparatus 100 is formed on the surface of the half mirror 112. This allows the user O located in front of the display apparatus 100 to see his/her own mirror image I1.

The camera 114 photographs the space in front of the half mirror 112 and thereby acquires a photographic picture. The photographic picture contains an image of an object existing in the space in front of the half mirror 112. The photographic picture also contains image information about each pixel (RGB) and depth information (Depth). Such a camera 114 is known as a depth camera, for example.

The display 116 displays a picture based on supplied picture information. When the supplied picture information contains an overlay image to be superimposed on the mirror image I1 formed on the surface of the half mirror 112, the display 116 displays the overlay image. When the supplied picture information does not contain an overlay image, the display 116 displays no overlay image. The display 116 may be, for example, a liquid crystal display.

Besides, the half mirror 112 is partially transparent to light incident from behind. This allows the user O located in front of the display apparatus 100 to see an overlay image displayed on the display 116 placed behind the half mirror 112.

As shown in FIG. 1, the display apparatus 100 also includes an input/output interface 152 (input/output I/F 152), a control unit 154, a program storage unit 156, and a data storage unit 158, as hardware configured to generate an overlay image to be displayed on the display 116, based on a photographic picture taken by the camera 114.

The input/output I/F 152, which is connected to the camera 114, accepts input of a photographic picture from the camera 114 that has acquired the photographic picture. The input/output I/F 152, which is also connected to the display 116, outputs an overlay image to the display 116, which then will display the overlay image.

The control unit 154 includes a hardware processor such as a CPU. The control unit 154 is connected with the input/output I/F 152, the program storage unit 156, and the data storage unit 158 via a bus. The control unit 154 reads a photographic picture via the input/output I/F 152, reads information from the program storage unit 156 and the data storage unit 158, processes the read photographic picture and information, thereby generating an overlay image, and outputs the overlay image to the input/output I/F 152.

The program storage unit 156 is, for example, a main memory, and stores a program configured to make the control unit 154 perform necessary processes as well as stores an OS and middle ware. The program storage unit 156 includes, for example, a nonvolatile memory that allows random read/write access. The nonvolatile memory is made up, for example, of an SSD. Alternatively, the nonvolatile memory is made up of a combination of an SSD and a ROM.

The data storage unit 158 is, for example, an auxiliary memory and stores data necessary for the processes performed by the control unit 154. The data storage unit 158 is made up, for example, of a combination of an SSD and a RAM.

The display apparatus 100 further includes an input unit 162 as hardware for use to enter information into the display apparatus 100. The input unit 162 is connected to the input/output I/F 152 and includes operation buttons and switches for use to enter commands for starting or stopping the display apparatus 100 or select items to be superimposed.

Figure 2:
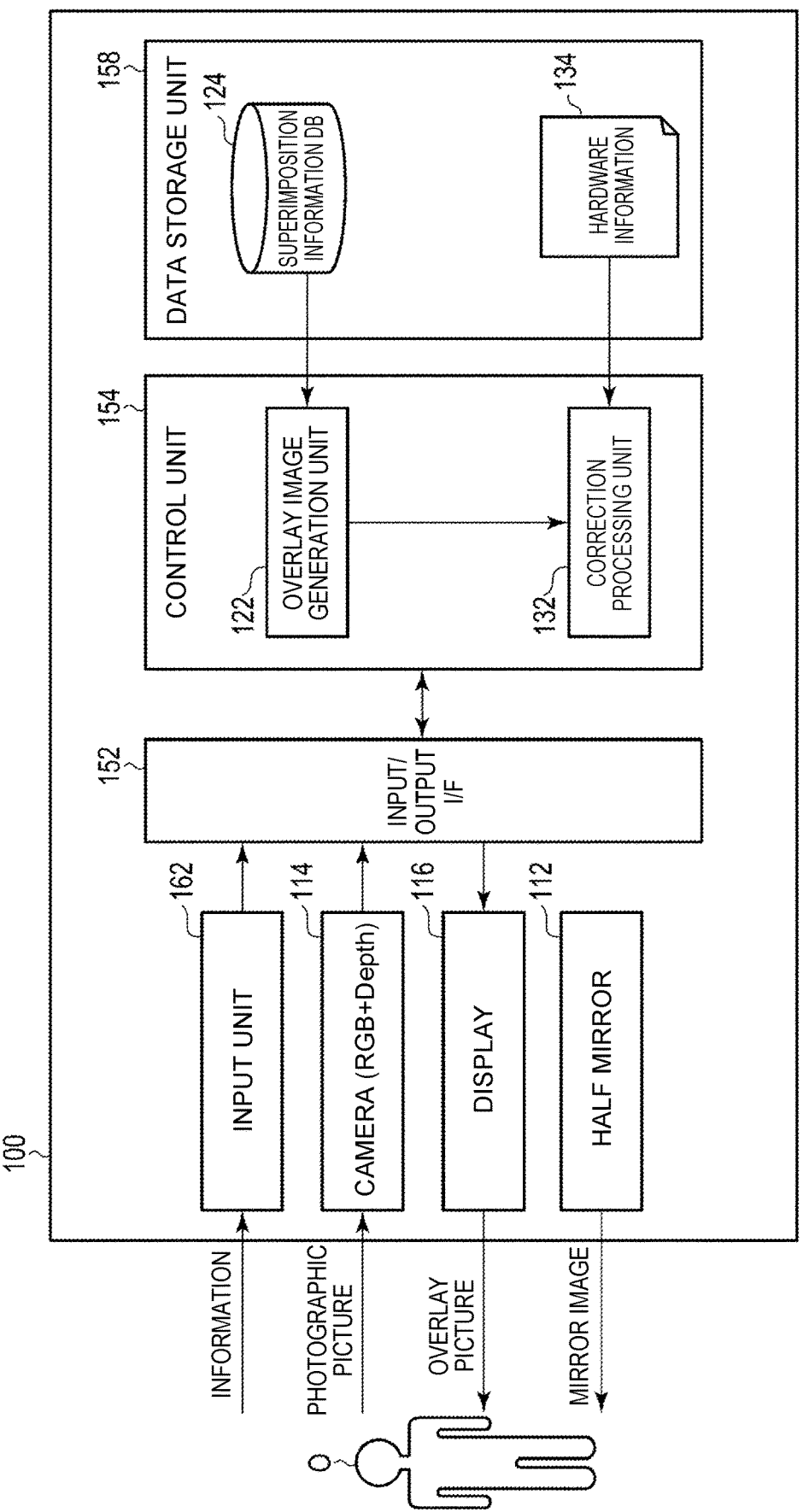
FIG. 2 is a block diagram showing a software configuration of the display apparatus according to the first embodiment of the present invention.

As shown in FIG. 2, the control unit 154 includes an overlay image generation unit 122 and a correction processing unit 132, and the data storage unit 158 stores a superimposition information database 124 (superimposition information DB 124) and hardware information 134.

The superimposition information DB 124 contains information needed to generate an overlay image. For example, as shown in FIG. 5, the superimposition information DB 124 has plural records, each of which contains ID, Name, Genre-to-be-superimposed, Superimposition area, Overlay text, and Overlay image fields.

The hardware information 134 includes information about the half mirror 112 and camera 114. For example, as shown in FIG. 6, the hardware information 134 includes information about a horizontal viewing angle and vertical viewing angle as information about the camera 114. The hardware information 134 also includes width and height information as information about the half mirror 112.

The overlay image generation unit 122 determines whether to display or hide an overlay image on a mirror image on the half mirror 112 and selects the overlay image, based on a photographic picture taken by the camera 114 and information from the superimposition information DB 124.

The correction processing unit 132 performs a correction process with respect to an overlay image relative to a mirror image on the half mirror 112 based on the hardware information 134. The correction process with respect to the overlay image includes correction of the display position of the overlay image and correction of the size of the overlay image.

Now a problem with the display apparatus 100 and a purpose of the correction processing unit 132 will be described with reference to FIG. 7. An example of superimposing a headphone image on a mirror image of the user O on the half mirror 112 will be described below.

For example, depending on the focal length of the camera 114, discrepancies may occur between size/position of an image of the user O on a photographic picture and size/position of a mirror image of the user O on the half mirror 112. For example, in the example shown on the left side of FIG. 7, a figure I1B of the user O on a photographic picture is larger in size than a mirror image I1A of the user O on the half mirror 112, and the position of the figure I1B is shifted upward.

Figure 7:
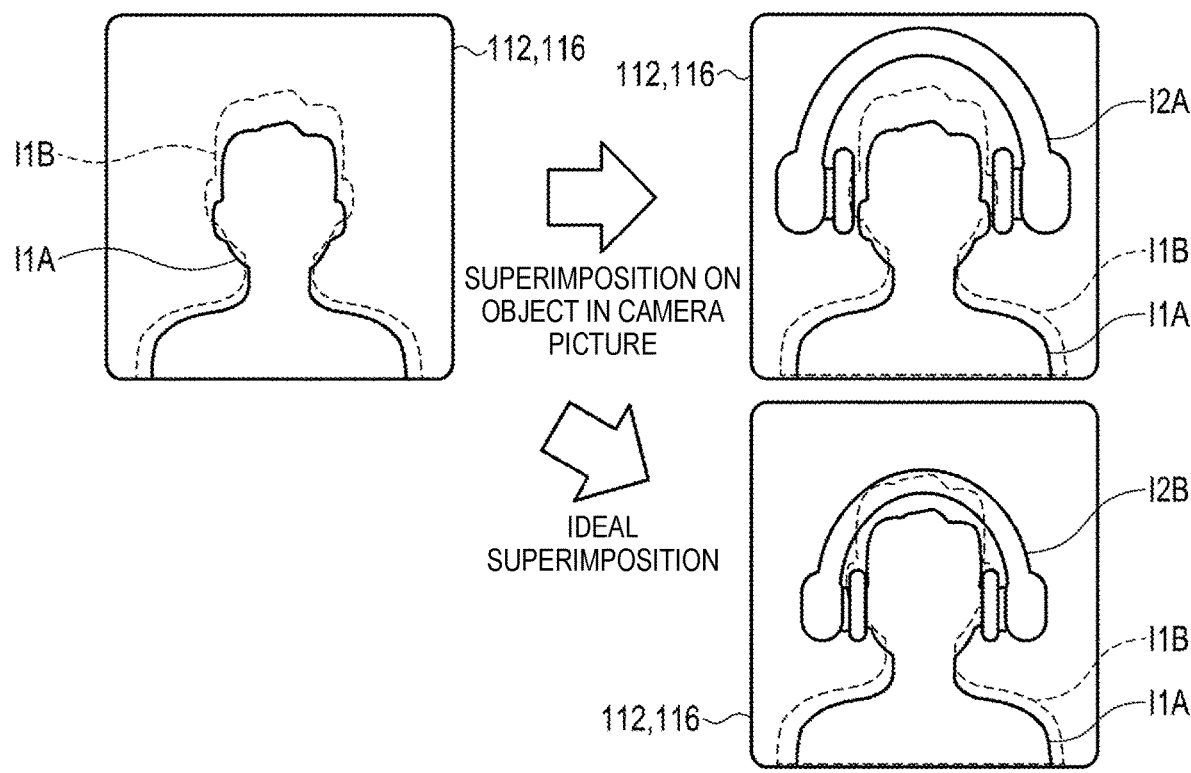
FIG. 7 is a diagram explaining a problem with the display apparatus and a purpose of a correction processing unit.

In this case, if the headphone image to be superimposed on the mirror image I1A of the user O is selected and displayed on the display 116 as it is based on the photographic picture, as shown on the upper right side of FIG. 7, for the images on the display apparatus 100 visible to the user O, a headphone image I2A to be superimposed is too large compared to the mirror image I1A of the user O on the half mirror 112, and the position of the headphone image I2A is shifted upward. That is, the headphone image I2A is superimposed unnaturally on the mirror image of the user O.

The correction processing unit 132 corrects the size and position of the headphone image I2A to be superimposed to obtain ideal superimposition such as shown on the lower right side of FIG. 7. In the ideal superimposition, the corrected headphone image I2B is appropriate in size and position for the mirror image I1A of the user O on the half mirror 112.

Figure 8:
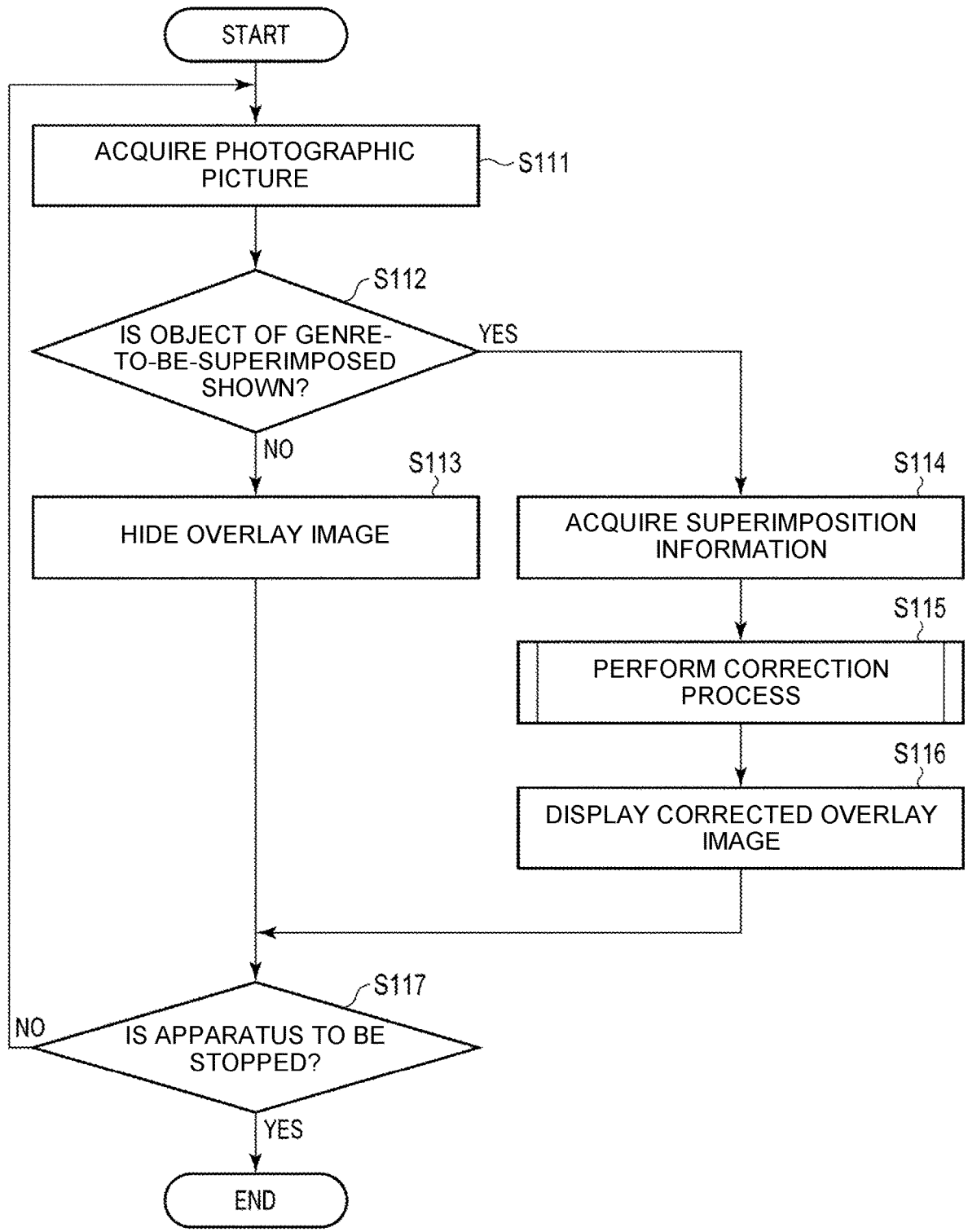
FIG. 8 is a flowchart explaining a process of the display apparatus shown in FIGS. 1 and 2.

A process of the display apparatus 100 will be described below with reference to FIG. 8. Here, it is assumed that the user O of the display apparatus 100 is located in front of the half mirror 112.

First, upon startup of the display apparatus 100, the process goes to step S111.

(Step S111) The camera 114 takes a photo of the view in front of the half mirror 112 and thereby acquires a photographic picture. The photographic picture taken by the camera 114 contains an image of the user O located in front of the half mirror 212. The control unit 154 acquires the photographic picture from the camera 114 via the input/output I/F 152. The acquired photographic picture is used, as appropriate, by the overlay image generation unit 122 and the correction processing unit 132. Subsequently, the process goes to step S112.

(Step S112) The overlay image generation unit 122 acquires information about an object in a genre-to-be-superimposed from the superimposition information DB 124. Here, the object is the user O, i.e., a human being. The overlay image generation unit 122 determines whether there is an object of the genre-to-be-superimposed on the acquired photographic picture. If the object is not shown, the process goes to step S113. If the object is shown, the process goes to step S114.

(Step S113) The control unit 154 hides the overlay image on the display 116. For that, the control unit 154 supplies the display 116 with display information containing no overlay image via the input/output I/F 152. The display 116 displays a picture according to supplied picture information. That is, the display 116 displays no overlay image. Subsequently, the process goes to step S117.

(Step S114) The overlay image generation unit 122 acquires superimposition information to be superimposed. For that, the overlay image generation unit 122 acquires superimposition information corresponding to the object in the genre-to-be-superimposed shown in the photographic picture. The superimposition information includes the superimposition area, the overlay text, and the overlay image among the fields for the object in the genre-to-be-superimposed shown in the photographic picture. Here, the overlay image is a headphone image, and thus the superimposition area is "Ears to upper head," the overlay text is "-(none)," and the overlay image is "headphone.jpg." Subsequently, the process goes to step S115.

(Step S115) The correction processing unit 132 performs a correction process on the superimposition information acquired by the overlay image generation unit 122, based on the hardware information 134. Here, the correction process is correction of the position and size of the headphone image. Details of the correction process will be described later. Subsequently, the process goes to step S116.

(Step S116) The control unit 154 displays the overlay image obtained and corrected in step S115 on the display 116. For that, the control unit 154 supplies display information including the overlay image corrected by the correction processing unit 132 to the display 116 via the input/output I/F 152. The display 116 displays a picture according to supplied picture information. That is, the display 116 displays an overlay image. Subsequently, the process goes to step S117.

(Step S117) The control unit 154 determines whether a command to stop the display apparatus 100 has been entered. If a stop command has not been entered, the process returns to step S111. If a stop command has been entered, the process is finished.

Figure 9:
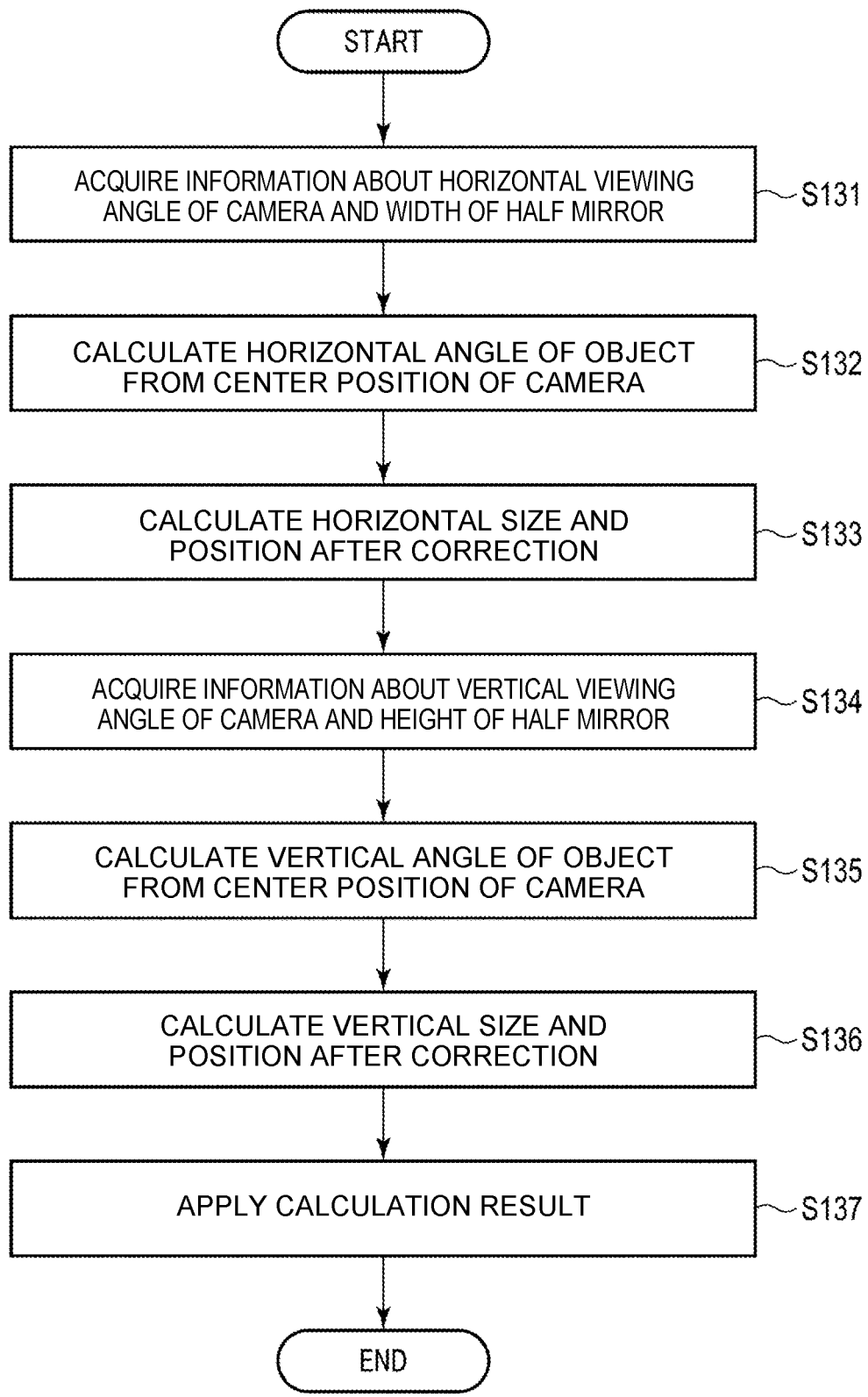
FIG. 9 is a flowchart explaining the correction process shown in FIG. 8.

Next, a correction process based on the hardware information 134 in step S115 will be described with reference to FIG. 9. Prior to the description of the correction process, some parameters are defined as follows.

Figure 10:
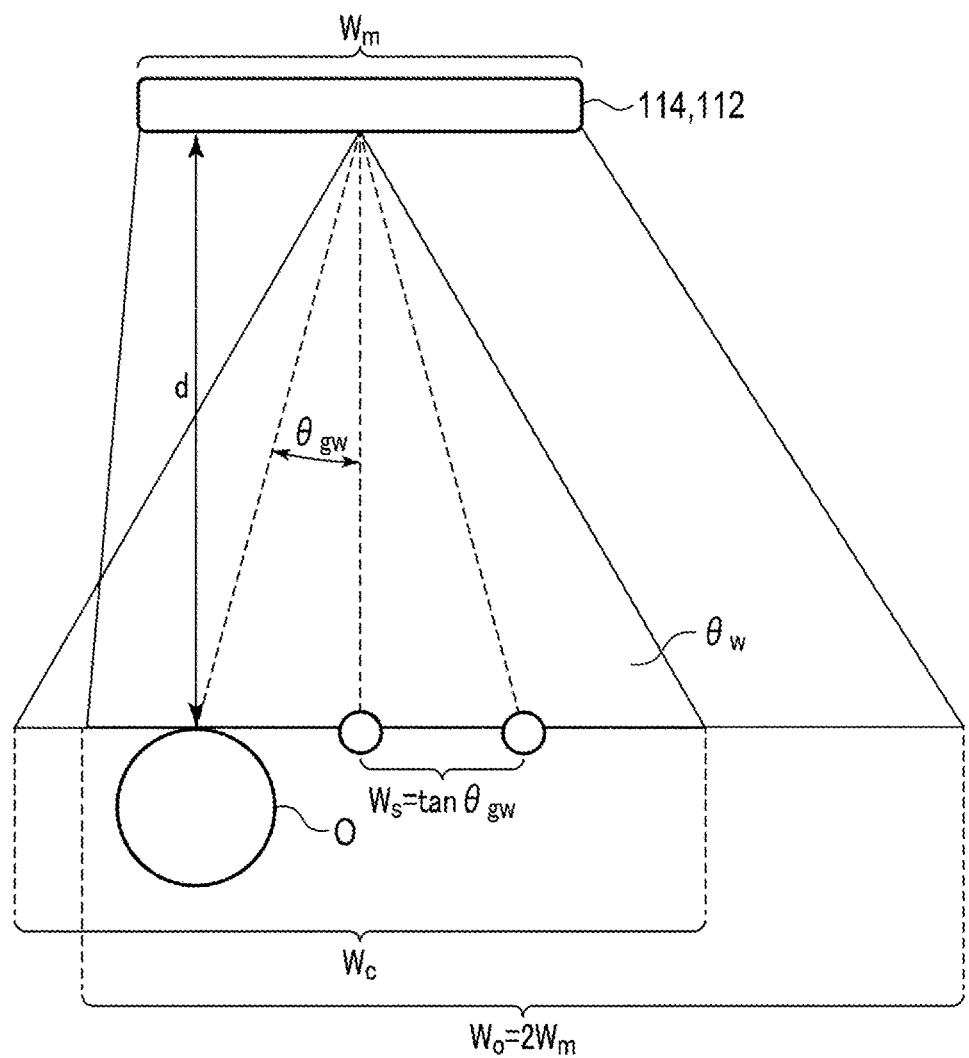
FIG. 10 is a diagram showing parameters for use to explain the correction process shown in FIG. 8.

As shown in FIG. 10, let $W_m$ denote the width of the half mirror 112, let $\theta_w$ denote the horizontal viewing angle of the camera 114, let d denote the distance between the camera 114 and the user O, and let $\theta_{gw}$ denote the angle between a normal to the center of the angle of view of the camera 114 and a horizontal line extending from the center of the angle of view of the camera 114 to the user O, then a horizontal range $W_o$ covered by the half mirror 112 as viewed by the user O at the distance d is $2W_m$, a horizontal shift $W_s$ of the center position is $\tan \theta_{gw}$, and a horizontal coverage width W up to the user O of the camera 114 is $2d \cdot \tan(\theta_w/2)$.

FIG. 10 diagrammatically illustrates parameters related to the horizontal direction. Although parameters related to the vertical direction is not illustrated, let $H_m$ denote the height of the half mirror 112, let $\theta_h$ denote the vertical viewing angle of the camera 114, and let $\theta_{gh}$ denote the angle between a normal to the center of the angle of view of the camera 114 and a vertical line extending from the center of the angle of view of the camera 114 to the user O, then a vertical range $H_o$ covered by the half mirror 112 as viewed by the user O at the distance d is $2H_m$, a vertical shift $H_s$ of the center position is $\tan \theta_{gh}$, and a vertical coverage width $H_c$ up to the user O of the camera 114 is $2d \cdot \tan(\theta_h/2)$.

(Step S131) Information about the horizontal viewing angle $\theta_w$ of the camera 114 and the width $W_m$ Of the half mirror 112 is acquired. Subsequently, the process goes to step S132.

(Step S132) The angle $\theta_{gw}$ between a normal to the center of the angle of view of the camera 114 and a horizontal line extending from the center of the angle of view of the camera 114 to the user O is calculated. Subsequently, the process goes to step S133.

(Step S133) The horizontal size and position of the headphone image after the correction are calculated. Specifically, a scaling factor $W_c/2W_m$ of the width and horizontal movement $(W_c/2W_m)+\tan \theta_{gw}$ of the position with respect to the original headphone image acquired from the superimposition information DB 124 are calculated. Subsequently, the process goes to step S134.

(Step S134) Information about the vertical viewing angle $\theta_h$ of the camera 114 and the height $H_m$ Of the half mirror 112 is acquired. Subsequently, the process goes to step S135.

(Step S135) The angle $\theta_{gh}$ between a normal to the center of the angle of view of the camera 114 and a vertical line extending from the center of the angle of view of the camera 114 to the user O is calculated. Subsequently, the process goes to step S136.

(Step S136) The vertical size and position of the headphone image after the correction are calculated. Specifically, a scaling factor $H_c/2H_m$ of the height and vertical movement $(H_c/2H_m)+\tan\theta_{gh}$ of the position with respect to the original headphone image acquired from the superimposition information DB 124 are calculated. Subsequently, the process goes to step S137.

Figure 11:
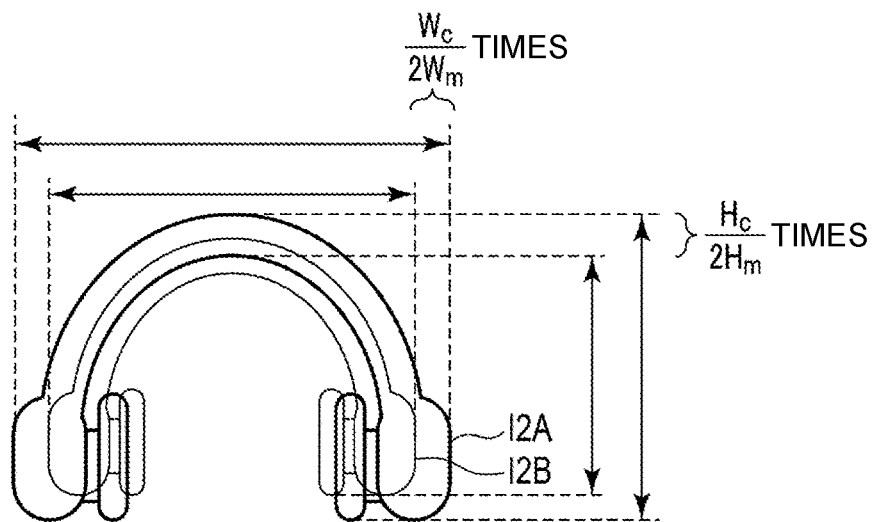
FIG. 11 is a diagram showing overlay images taken before and after a size correction process and placed in superposition.

(Step S137) The scaling factor $W_c/2W_m$ of the width and the horizontal movement $(W_c/2W_m)+\tan\theta_{gw}$ that have been calculated in step S133, and the scaling factor $H_c/2H_m$ of the height and the vertical movement $(H_c/2H_m)+\tan\theta_{gh}$ that have been calculated in step S136 are applied to the original headphone image acquired from the superimposition information DB 124. That is, as shown in FIG. 11, the original headphone image is multiplied by $W_c/2W_m$ in the horizontal direction and by $H_c/2H_m$ in the vertical direction.

Figure 12:
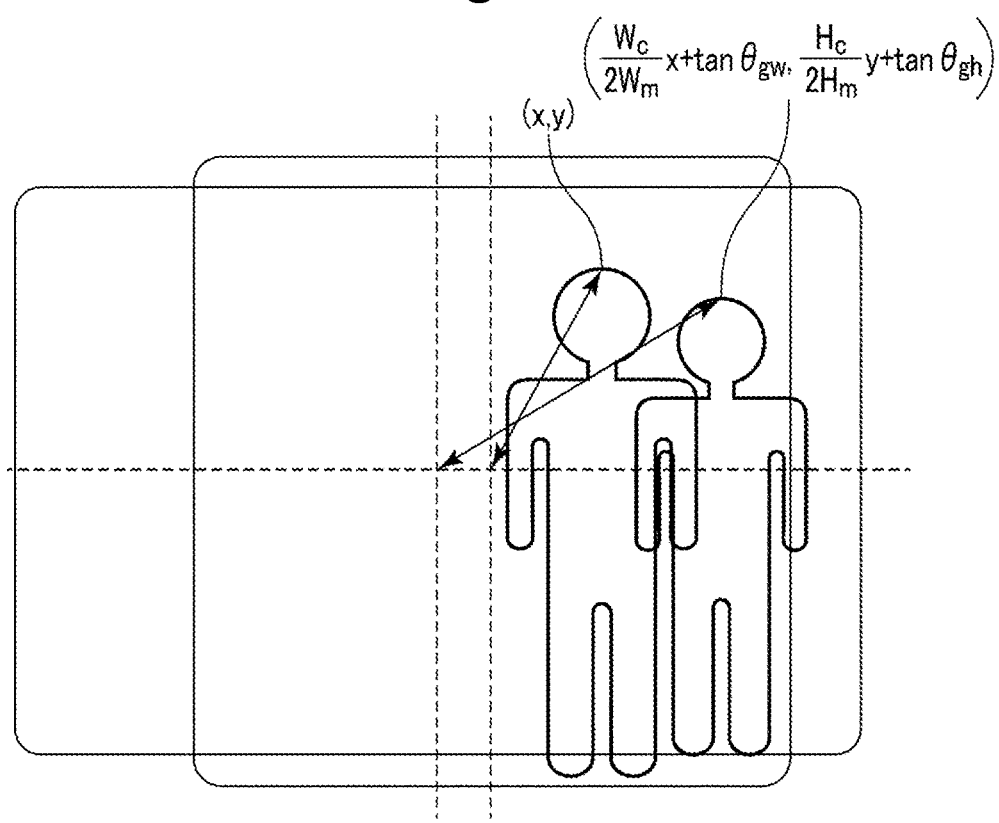
FIG. 12 is a diagram showing overlay images taken before and after a position correction process and placed in superposition.

Furthermore, as shown in FIG. 12, the original headphone image is moved $(W_c/2W_m)+\tan\theta_{gw}$ in the horizontal direction and moved $(H_c/2H_m)+\tan\theta_{gh}$ in the vertical direction. Moving an image means changing the coordinates of the display position of the image on the display 116. By going through the above steps, the correction process is finished.

The overlay image thus corrected is displayed on the display 116 in step S116. Consequently, as shown on the lower right side of FIG. 7, the headphone image I2A appropriate in size for the mirror image I1A of the user O on the half mirror 112 is superimposed at a position appropriate for the mirror image I1A of the user O. In other words, the headphone image appropriately scaled in relation to the mirror image I1A of the user O is displayed at such a position as to appear to the user O that the headphone is put snugly on the user O.

Consequently, for example, as shown in FIG. 3, the user O can look at the headphone image I2A superimposed on his/her own mirror image I1A, without feeling anything odd.

Second Embodiment

Figure 13:
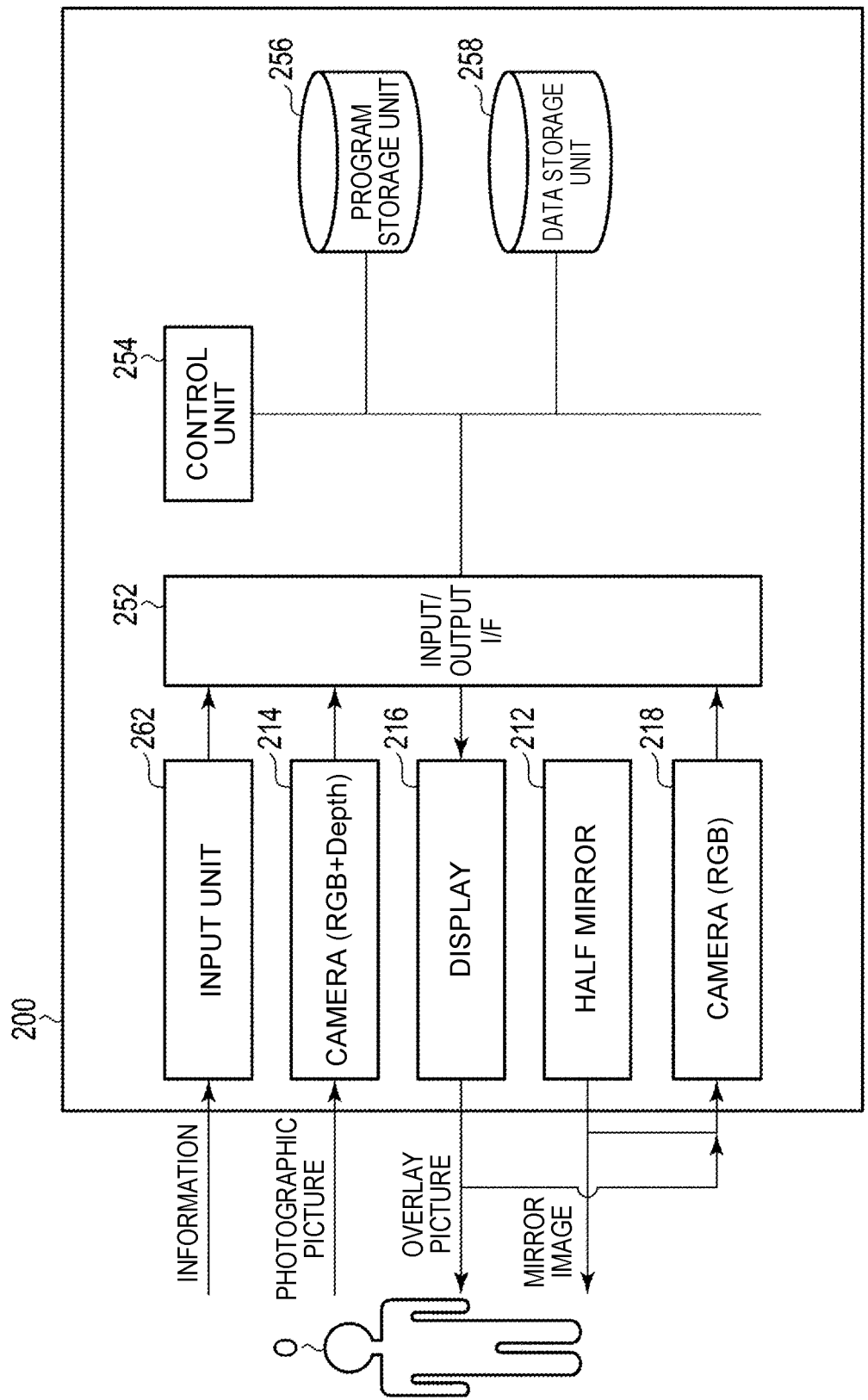
FIG. 13 is a block diagram showing a hardware configuration of a display apparatus according to a second embodiment of the present invention.

As shown in FIG. 13, a display apparatus 200 according to the present embodiment includes a half mirror 212, a camera 214, a display 216, and a camera 218 as hardware.

The half mirror 212, the camera 214, and the display 216 are configured similarly to the half mirror 112, the camera 114, and the display 116 according to the first embodiment, respectively.

Figure 15:
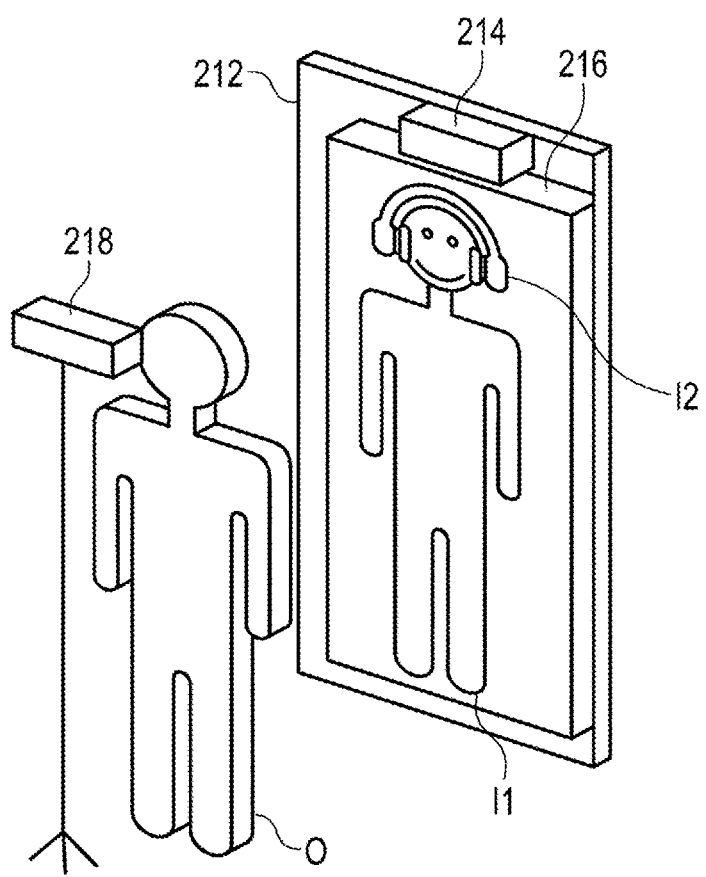
FIG. 15 is a perspective view of the half mirror, display, and camera shown in FIGS. 13 and 14.

As shown in FIG. 15, the camera 218 is placed in front of the half mirror 212. The camera 218 photographs the half mirror 212 from the front. Specifically, the camera 218 photographs a mirror image formed on the half mirror 212 and an overlay image displayed on the display 216 and thereby acquires a photographic picture of the mirror image and overlay image.

As shown in FIG. 13, the display apparatus 200 also includes an input/output interface 252 (input/output I/F 252), a control unit 254, a program storage unit 256, and a data storage unit 258, as hardware configured to generate an overlay image to be displayed on the display 216, based on photographic pictures taken by the cameras 214 and 218.

The input/output I/F 252 and the program storage unit 256 are configured similarly to the input/output I/F 152 and the program storage unit 156 according to the first embodiment, respectively. As hardware, the control unit 254 and the data storage unit 258 are configured similarly to the control unit 154 and the data storage unit 158 according to the first embodiment, respectively.

The display apparatus 200 further includes an input unit 262 as hardware for use to enter information into the display apparatus 200. The input unit 262 is connected to the input/output I/F 252 and includes operation buttons and switches for use to enter commands for starting or stopping the display apparatus 200 or select items to be superimposed.

Figure 14:
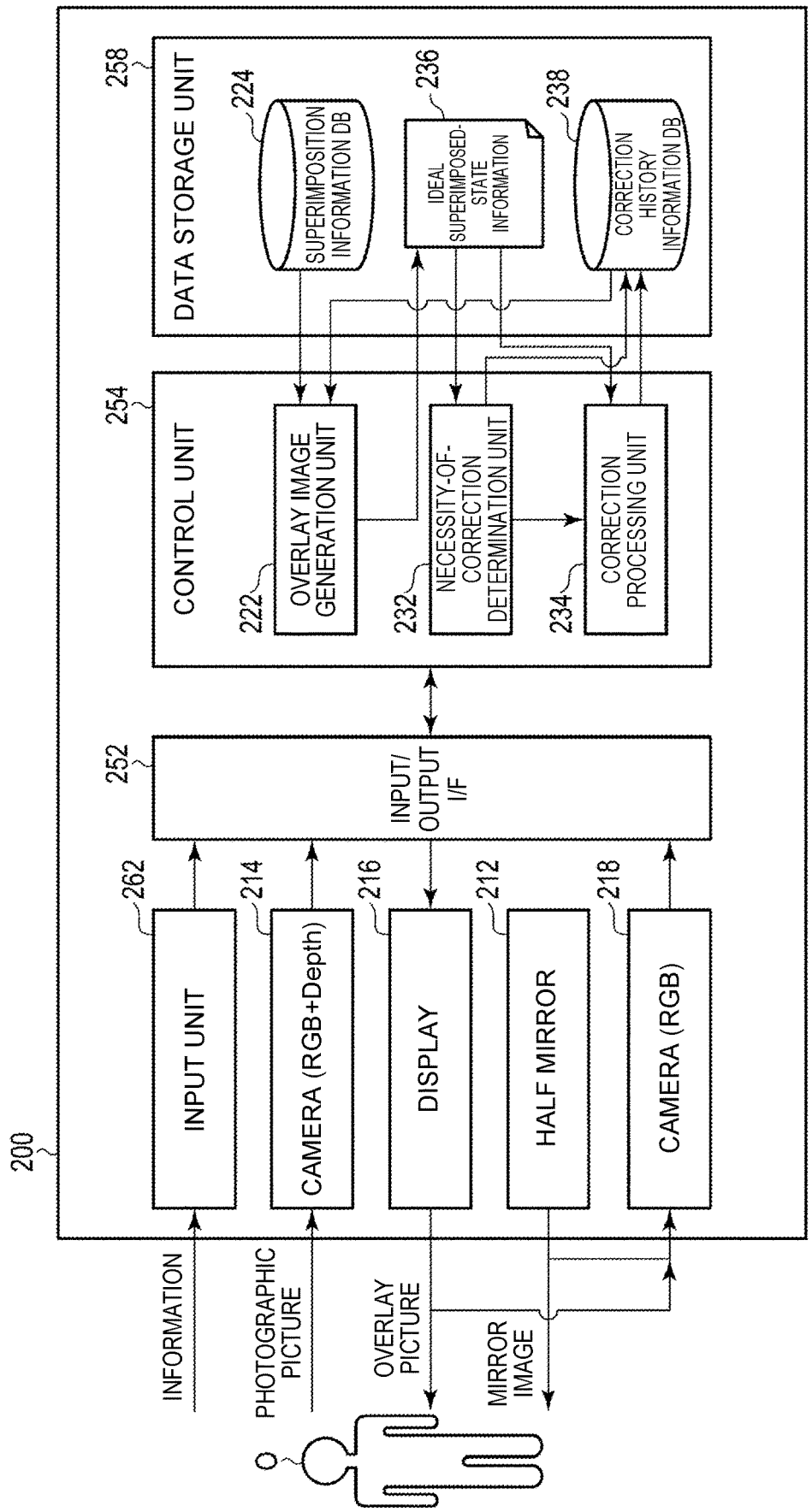
FIG. 14 is a block diagram showing a software configuration of the display apparatus according to the second embodiment of the present invention.

As shown in FIG. 14, the control unit 254 includes an overlay image generation unit 222, a necessity-of-correction determination unit 232, and a correction processing unit 234, and the data storage unit 258 stores a superimposition information database 224 (superimposition information DB 224) as well as stores an ideal superimposed-state information 236 and a correction history database 238 (correction history information DB 238) when necessary.

The superimposition information DB 224 is configured similarly to the superimposition information DB 124 according to the first embodiment.

The ideal superimposed-state information 236 concerns ideal superimposition. For example, the ideal superimposed-state information 236 is a picture obtained by superimposing an overlay image on a photographic picture taken by the camera 214, where the overlay image is generated based on the photographic picture.

The correction history information DB 238 contains correction history information. For example, as shown in FIG. 16, the correction history information DB 238 has plural records, each of which contains ID, Date/time, Correction genre, Correction details, and Similarity distance fields.

The overlay image generation unit 222 determines whether to display or hide an overlay image on a mirror image on the half mirror 212 and selects the overlay image, based on a photographic picture taken by the camera 214, information from the superimposition information DB 224, and correction history information from the correction history information DB 238.

The necessity-of-correction determination unit 232 determines whether correction is necessary based on a photographic picture taken by the camera 218 and on the ideal superimposed-state information 236.

When the necessity-of-correction determination unit 232 determines that correction is necessary, the correction processing unit 234 corrects the overlay image relative to the mirror image on the half mirror 212 based on the ideal superimposed-state information 236. The correction of the overlay image includes correction of the display position of the overlay image and correction of the size of the overlay image.

If it is determined that correction is necessary, the necessity-of-correction determination unit 232 outputs correction implementation information to the correction history information DB 238. The correction implementation information is, for example, the date and time when the determination as to whether correction is necessary is made. The correction processing unit 234 outputs correction processing information to the correction history information DB 238. The correction processing information contains, for example, a correction genre, correction details, and similarity distance.

The correction history information DB 238 creates a record by combining the correction implementation information received from the necessity-of-correction determination unit 232 and the correction processing information received from the correction processing unit 234, and stores the record as correction history information.

Figure 17:
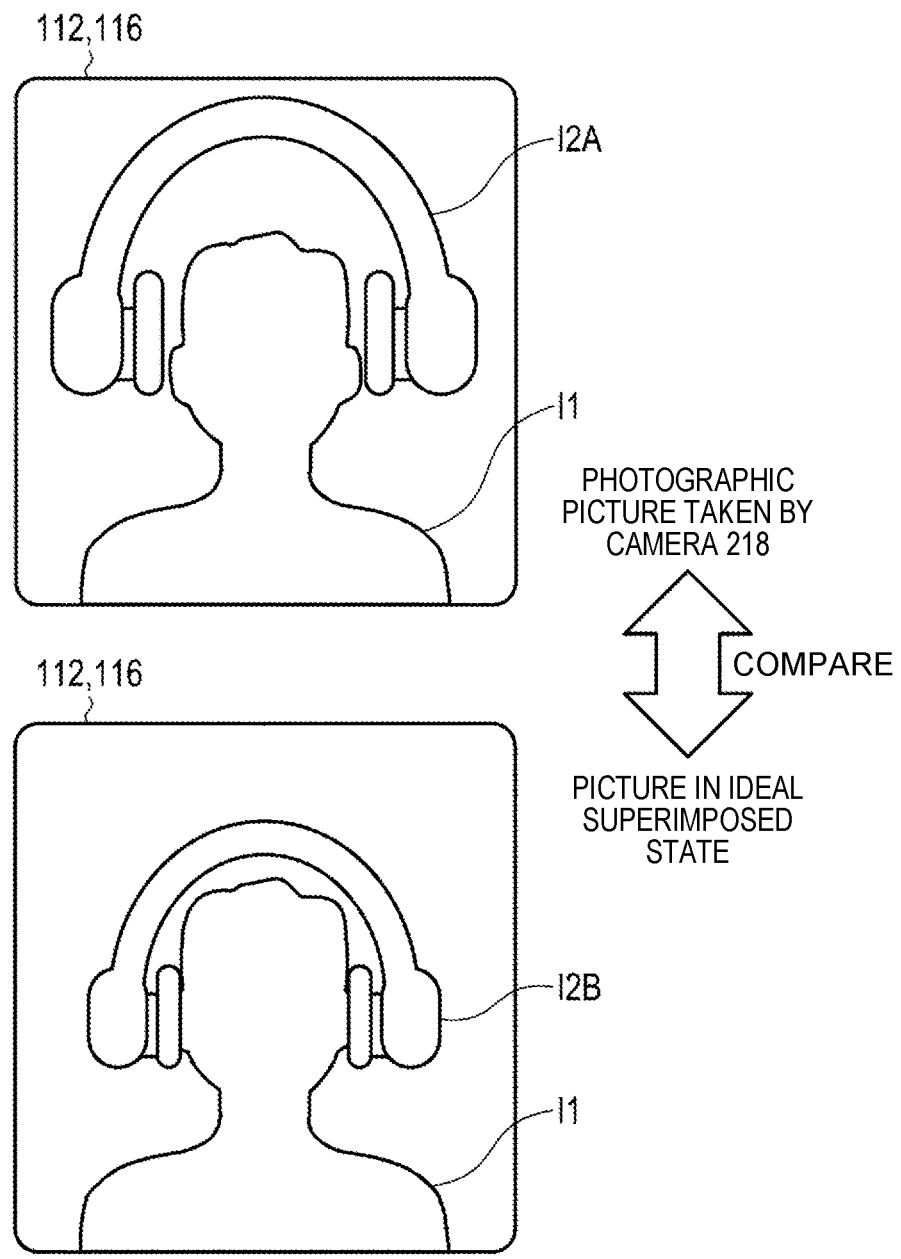
FIG. 17 is a diagram schematically explaining a correction process with respect to overlay images on the display apparatus shown in FIGS. 13 and 14.

According to the present embodiment, in FIG. 17, the top picture, i.e., the photographic picture taken by the camera 218, and the bottom picture, i.e., the picture in the ideal superimposed state, are compared and the overlay image is corrected. The photographic picture taken by the camera 218 is, in other words, a picture obtained by superimposing the overlay image on the mirror image of the user O based on a photographic picture taken by the camera 214.

Figure 18:
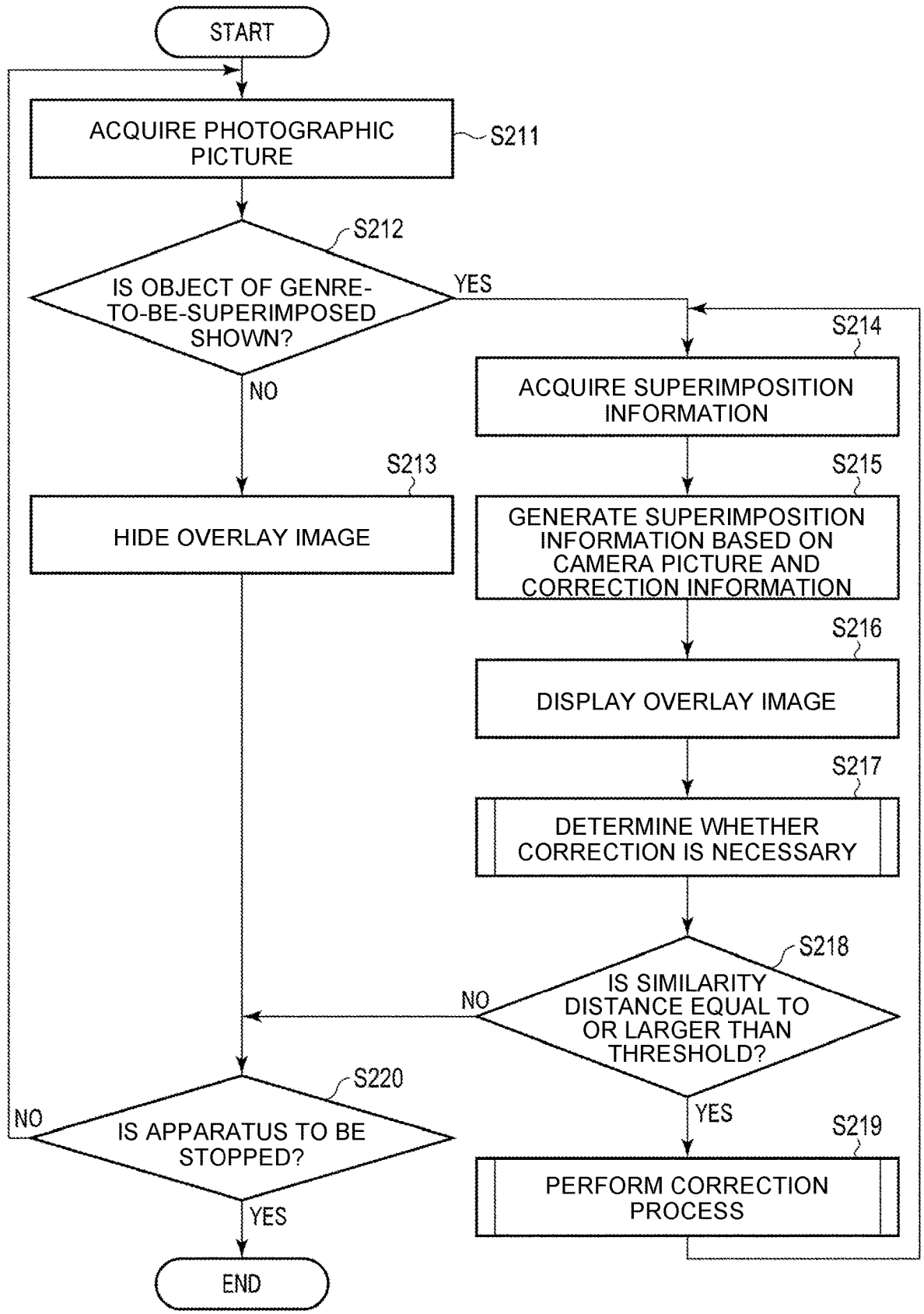
FIG. 18 is a flowchart explaining a process of the display apparatus shown in FIGS. 13 and 14.

A process of the display apparatus 200 will be described below with reference to FIG. 18. Here, it is assumed that the user O of the display apparatus 200 is located in front of the half mirror 212.

First, upon startup of the display apparatus 200, the process goes to step S211.

(Step S211) The camera 214 takes a photo of the view in front of the half mirror 212 and thereby acquires a photographic picture. The photographic picture taken by the camera 214 contains an image of the user O located in front of the half mirror 212. The camera 218 takes a photo of the half mirror 212 and thereby acquires a photographic picture. The photographic picture taken by the camera 218 contains a mirror image formed on the half mirror 212 and a picture displayed on the display 216. The control unit 254 acquires the photographic pictures from the cameras 214 and 218 via the input/output I/F 252. The acquired photographic pictures are used, as appropriate, by the overlay image generation unit 222, the necessity-of-correction determination unit 232, and the correction processing unit 234. Subsequently, the process goes to step S212.

(Step S212) The overlay image generation unit 222 acquires information about an object in a genre-to-be-superimposed from the superimposition information DB 224. Here, the object is the user O, i.e., a human being. The overlay image generation unit 222 also determines whether there is an object of the genre-to-be-superimposed on the photographic picture taken by the camera 214. If the object is not shown, the process goes to step S213. If the object is shown, the process goes to step S214.

(Step S213) The control unit 254 hides the overlay image on the display 216. For that, the control unit 254 supplies the display 216 with display information containing no overlay image via the input/output I/F 252. The display 216 displays a picture according to supplied picture information. That is, the display 216 displays no overlay image. Subsequently, the process goes to step S220.

(Step S214) The overlay image generation unit 222 acquires superimposition information to be superimposed. For that, the overlay image generation unit 222 acquires superimposition information corresponding to the object in the genre-to-be-superimposed shown in the photographic picture. The acquisition of the superimposition information is similar to the first embodiment. Subsequently, the process goes to step S215.

(Step S215) Based on the photographic picture taken by the camera 214 and correction information acquired in step S219, the overlay image generation unit 222 generates superimposition information, i.e., an overlay image. Correction information does not always exist. If there is no correction information, the correction processing unit 234 generates an overlay image based solely on the photographic picture taken by the camera 214. Here, the overlay image is a headphone image.

Besides, the overlay image generation unit 222 stores a picture obtained by superimposing the overlay image on the photographic picture taken by the camera 214 in the data storage unit 258, as the ideal superimposed-state information 236. The ideal superimposed-state information 236 is stored only once in the first loop of step S214 to step S219. Subsequently, the process goes to step S216.

(Step S216) The control unit 254 displays the superimposition information, i.e., the overlay image, generated in step S215 on the display 216. For that, the control unit 254 supplies the display information including the overlay image generated by the overlay image generation unit 222 to the display 216 via the input/output I/F 252. The display 216 displays a picture according to the supplied picture information. That is, the display 216 displays the overlay image, i.e., the headphone image. Subsequently, the process goes to step S217.

(Step S217) Based on the photographic picture taken by the camera 218 and the ideal superimposed-state information 236, the necessity-of-correction determination unit 232 determines whether it is necessary to correct the overlay image. Details of the determination as to whether correction is necessary will be described later. Subsequently, the process goes to step S218.

(Step S218) The control unit 254 determines whether the similarity distance is equal to or larger than a threshold. If the similarity distance is equal to or larger than the threshold, the process goes to step S219. If the similarity distance is smaller than the threshold, the process goes to step S220.

(Step S219) Based on the photographic picture taken by the camera 218 and the ideal superimposed-state information 236, the correction processing unit 234 corrects the overlay image relative to the mirror image on the half mirror 212. The correction process with respect to the overlay image includes correction of the display position of the overlay image and correction of the size of the overlay image. Details of the correction process will be described later. Subsequently, the process returns to step S214.

(Step S220) The control unit 254 determines whether a command to stop the display apparatus 200 has been entered. If a stop command has not been entered, the process returns to step S211. If a stop command has been entered, the process is finished.

Figure 19:
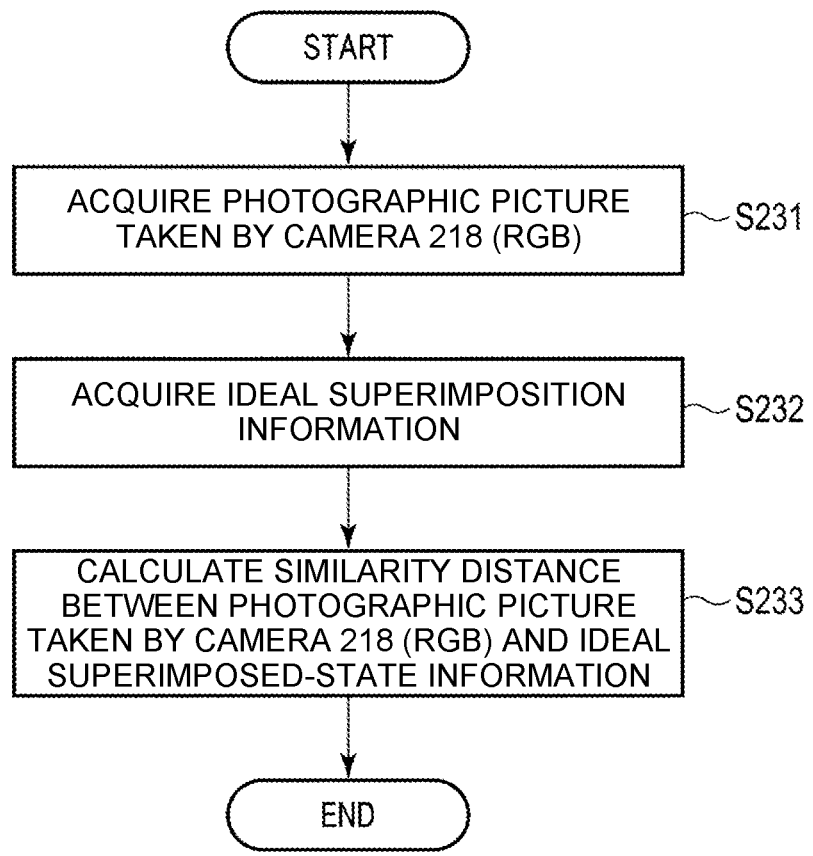
FIG. 19 is a flowchart explaining the necessity-of-correction determination process shown in FIG. 18.

Next, the determination made by the necessity-of-correction determination unit 232 in step S217 as to whether correction is necessary will be described with reference to FIG. 19.

(Step S231) The photographic picture taken by the camera 218 is acquired. As can be seen from FIG. 15, the photographic picture taken by the camera 218 includes the mirror image I1 of the user O formed on the half mirror 212 and the overlay image, i.e., the headphone image I2 displayed on the display 216. Subsequently, the process goes to step S232.

(Step S232) The ideal superimposed-state information 236 is acquired. Here, the ideal superimposed-state information 236 is a picture obtained by superimposing the overlay image, i.e., the headphone image, generated based on the photographic picture taken by the camera 214 on the photographic picture taken by the camera 214. Subsequently, the process goes to step S233.

(Step S233) A similarity distance between the photographic picture taken by the camera 218 and the ideal superimposed-state information is calculated. The similarity distance is calculated using, for example, the Hamming distance between perceptual hashes.

Figure 20:
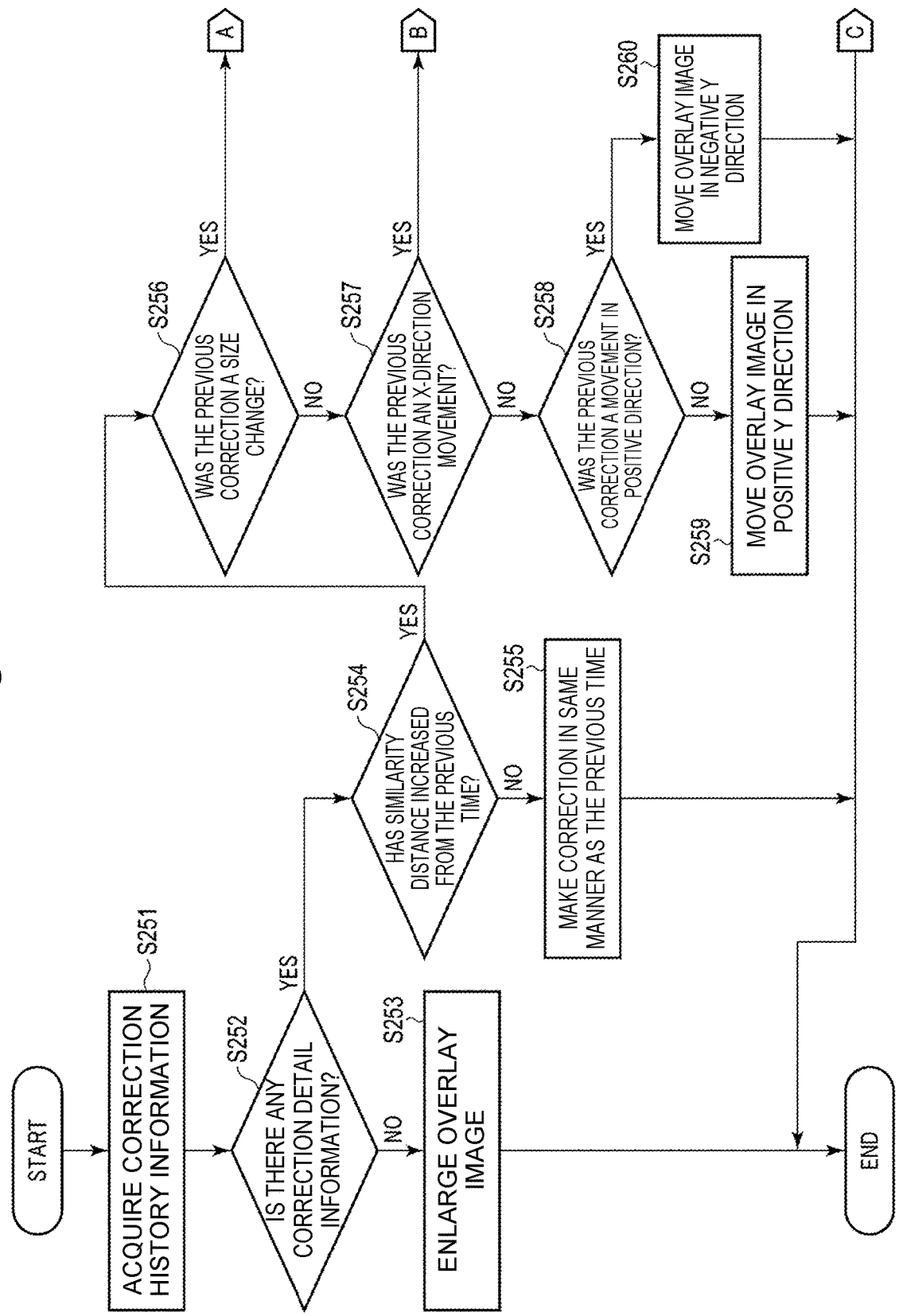
FIG. 20 is a flowchart explaining the correction process shown in FIG. 18.
Figure 21:
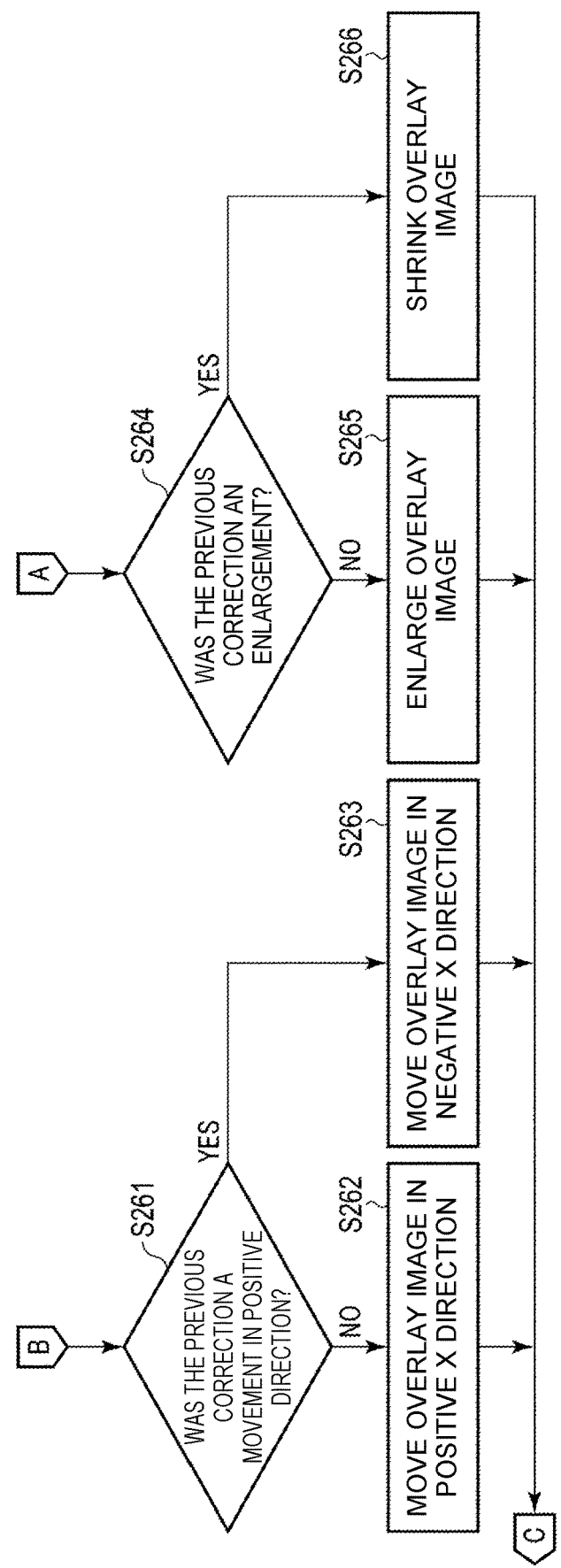
FIG. 21 is a flowchart explaining the correction process shown in FIG. 18.

Next, the overlay image correction process performed by the correction processing unit 234 in step S219 will be described with reference to FIGS. 20 and 21.

(Step S251) Correction history information is acquired from the correction history information DB 238. Subsequently, the process goes to step S252.

(Step S252) It is determined whether there is correction implementation information. If there is no correction implementation information, the process goes to step S253. If there is correction implementation information, the process goes to step S254.

(Step S253) The overlay image, i.e., the headphone image, is enlarged by a predetermined factor. The correction process is finished.

(Step S254) It is determined whether the similarity distance has increased from the previous time. If the similarity distance has not increased from the previous time, the process goes to step S255. If the similarity distance has increased from the previous time, the process goes to step S256.

(Step S255) The correction process is performed in the same manner as the previous time. The correction process is finished.

(Step S256) It is determined whether the previous correction process lay in changing the size of the overlay image. If the previous correction process did not lie in changing the size of the overlay image, the process goes to step S257. If the previous correction process lay in changing the size of the overlay image, the process goes to step S264.

(Step S257) It is determined whether the previous correction process lay in moving the overlay image in an X direction. If the previous correction process did not lie in moving the overlay image in the X direction, the process goes to step S258. If the previous correction process lay in moving the overlay image in the X direction, the process goes to step S261.

(Step S258) It is determined whether the previous correction process lay in moving the overlay image in a positive Y direction. If the previous correction process did not lie in moving the overlay image in the positive Y direction, the process goes to step S259. If the previous correction process lay in moving the overlay image in the positive Y direction, the process goes to step S260.

(Step S259) The overlay image is moved a predetermined distance in the positive Y direction. The correction process is finished.

(Step S260) The overlay image is moved a predetermined distance in the negative Y direction. The correction process is finished.

(Step S261) It is determined whether the previous correction process lay in moving the overlay image in a positive X direction. If the previous correction process did not lie in moving the overlay image in the positive X direction, the process goes to step S262. If the previous correction process lay in moving the overlay image in the positive X direction, the process goes to step S263.

(Step S262) The overlay image is moved a predetermined distance in the positive X direction. The correction process is finished.

(Step S263) The overlay image is moved a predetermined distance in the negative X direction. The correction process is finished.

(Step S264) It is determined whether the previous correction process lay in enlarging the overlay image. If the previous correction process did not lie in enlarging the overlay image, the process goes to step S265. If the previous correction process lay in enlarging the overlay image, the process goes to step S266.

(Step S265) The overlay image is enlarged by a predetermined factor. The correction process is finished.

(Step S266) The overlay image is enlarged by a predetermined factor. The correction process is finished.

The overlay image thus corrected is displayed on the display 216 in step S216. Consequently, as shown on the lower side of FIG. 17, the headphone image I2A appropriate in size for the mirror image I1A of the user O on the half mirror 212 is superimposed at a position appropriate for the mirror image I1A of the user O.

Consequently, for example, as shown in FIG. 15, the user O can look at the headphone image I2A superimposed on his/her own mirror image I1A, without feeling anything odd.

Third Embodiment

Figure 22:
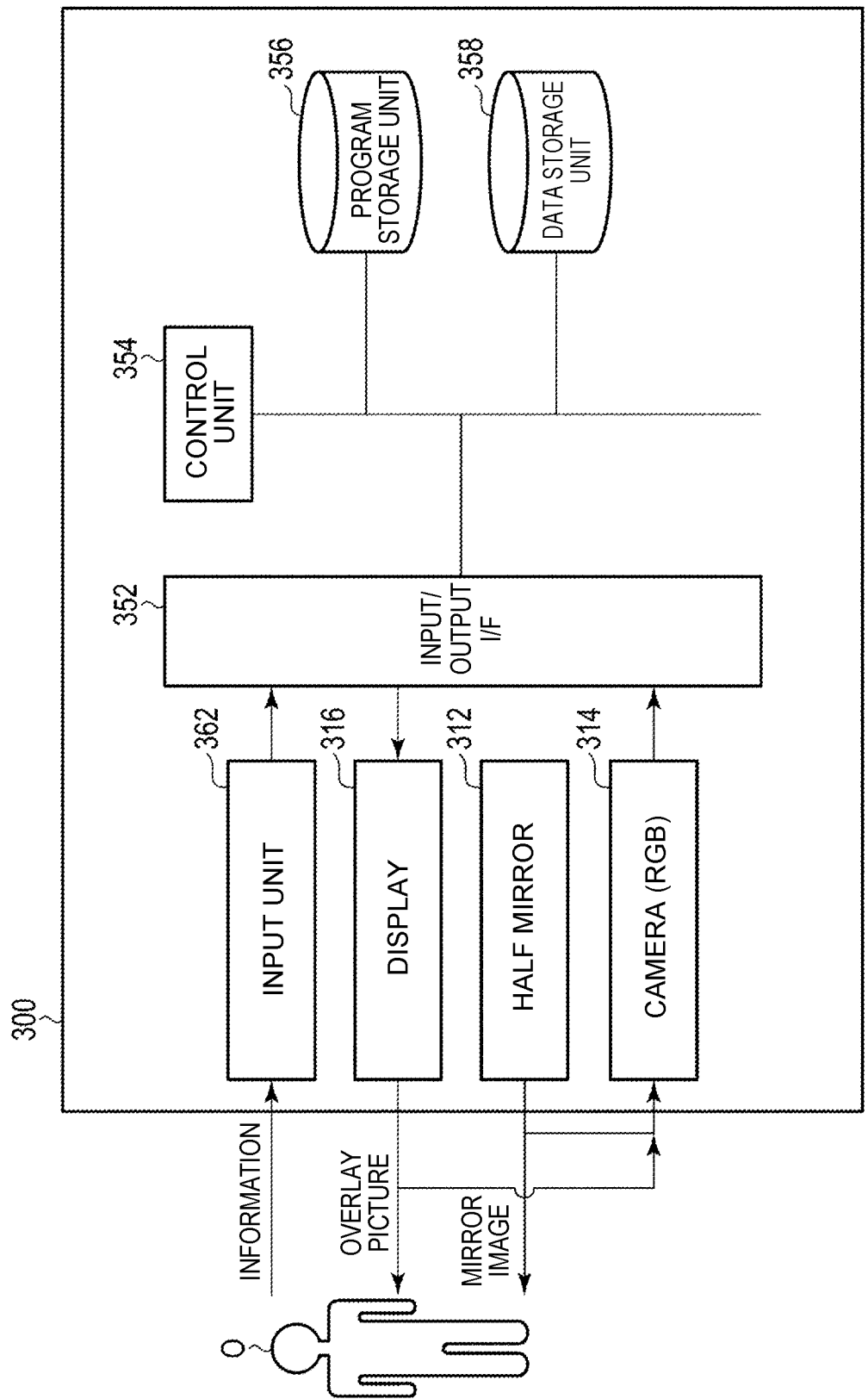
FIG. 22 is a block diagram showing a hardware configuration of a display apparatus according to a third embodiment of the present invention.

As shown in FIG. 22, a display apparatus 300 according to the present embodiment includes a half mirror 312, a camera 314, and a display 316, as hardware.

The half mirror 312 and the display 316 are configured similarly to the half mirror 112 and display 116 according to the first embodiment, respectively. The camera 314 is configured similarly to the camera 218 according to the second embodiment.

Figure 24:
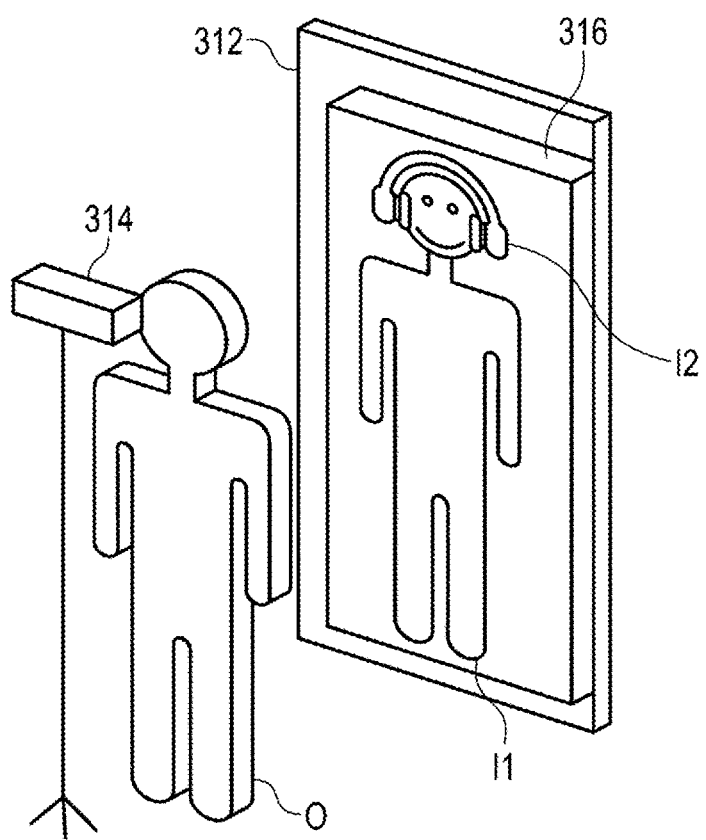
FIG. 24 is a perspective view of the half mirror, display, and camera shown in FIGS. 22 and 23.

As shown in FIG. 24, the camera 314 is placed in front of the half mirror 312. The camera 314 photographs the half mirror 212 from the front. Specifically, the camera 314 photographs a mirror image formed on the half mirror 312 and an overlay image displayed on the display 316 and thereby acquires a photographic picture of the mirror image and overlay image.

As shown in FIG. 22, the display apparatus 300 also includes an input/output interface 352 (input/output I/F 352), a control unit 354, a program storage unit 356, and a data storage unit 358, as hardware configured to generate an overlay image to be displayed on the display 316, based on a photographic picture taken by the camera 314.

The input/output I/F 352 and the program storage unit 356 are configured similarly to the input/output I/F 152 and the program storage unit 156 according to the first embodiment, respectively. As hardware, the control unit 354 and the data storage unit 358 are configured similarly to the control unit 154 and the data storage unit 158 according to the first embodiment, respectively.

The display apparatus 300 further includes an input unit 362 as hardware for use to enter information into the display apparatus 300. The input unit 362 is connected to the input/output I/F 352 and includes operation buttons and switches for use to enter commands for starting or stopping the display apparatus 300 or select items to be superimposed.

Figure 23:
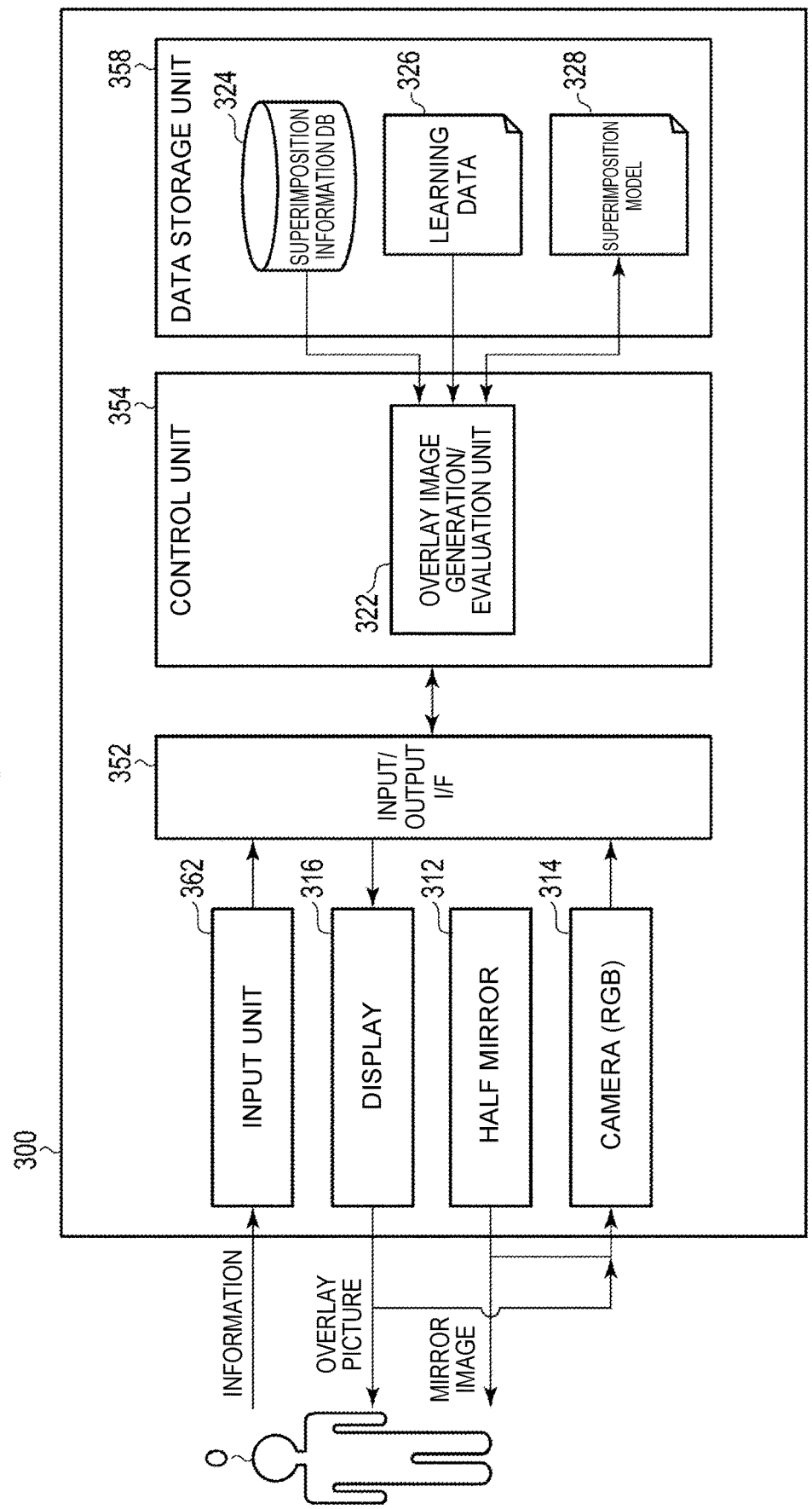
FIG. 23 is a block diagram showing a software configuration of the display apparatus according to the third embodiment of the present invention.

As shown in FIG. 23, the control unit 354 includes an overlay image generation/evaluation unit 322 while the data storage unit 358 stores superimposition information database 324 (superimposition information DB 324), learning data 336, and a superimposition model 328 and updates the superimposition model 328 when necessary.

The superimposition information DB 224 is configured similarly to the superimposition information DB 124 according to the first embodiment.

The learning data 336 is information for machine learning that involves learning the superimposition model 328.

The superimposition model 328 has been learned by machine learning using the learning data 336 and relearned using photographic pictures taken by the camera 314 and the learning data 336.

Figure 25:
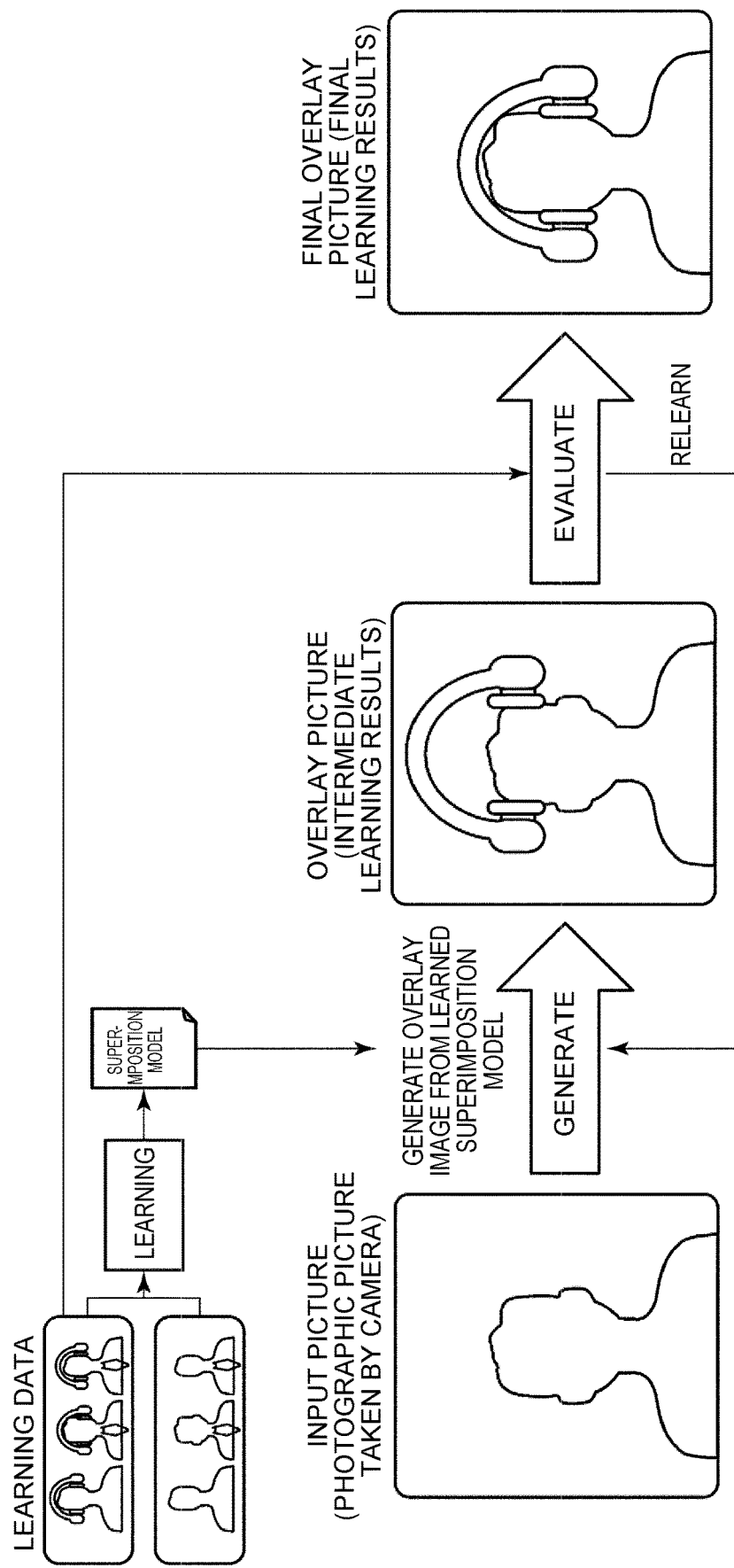
FIG. 25 is a diagram schematically explaining a generation process for overlay images on the display apparatus shown in FIGS. 22 and 23.

The overlay image generation/evaluation unit 322 generates an overlay image by machine learning. Specifically, as shown in FIG. 25, the overlay image generation/evaluation unit 322 generates an overlay image based on the superimposition model 328 learned using the learning data 326, repeats evaluation and relearning using photographic pictures taken by the camera 314, and thereby repeats correcting the display position and size of the overlay image to generate a final overlay image.

Figure 26:
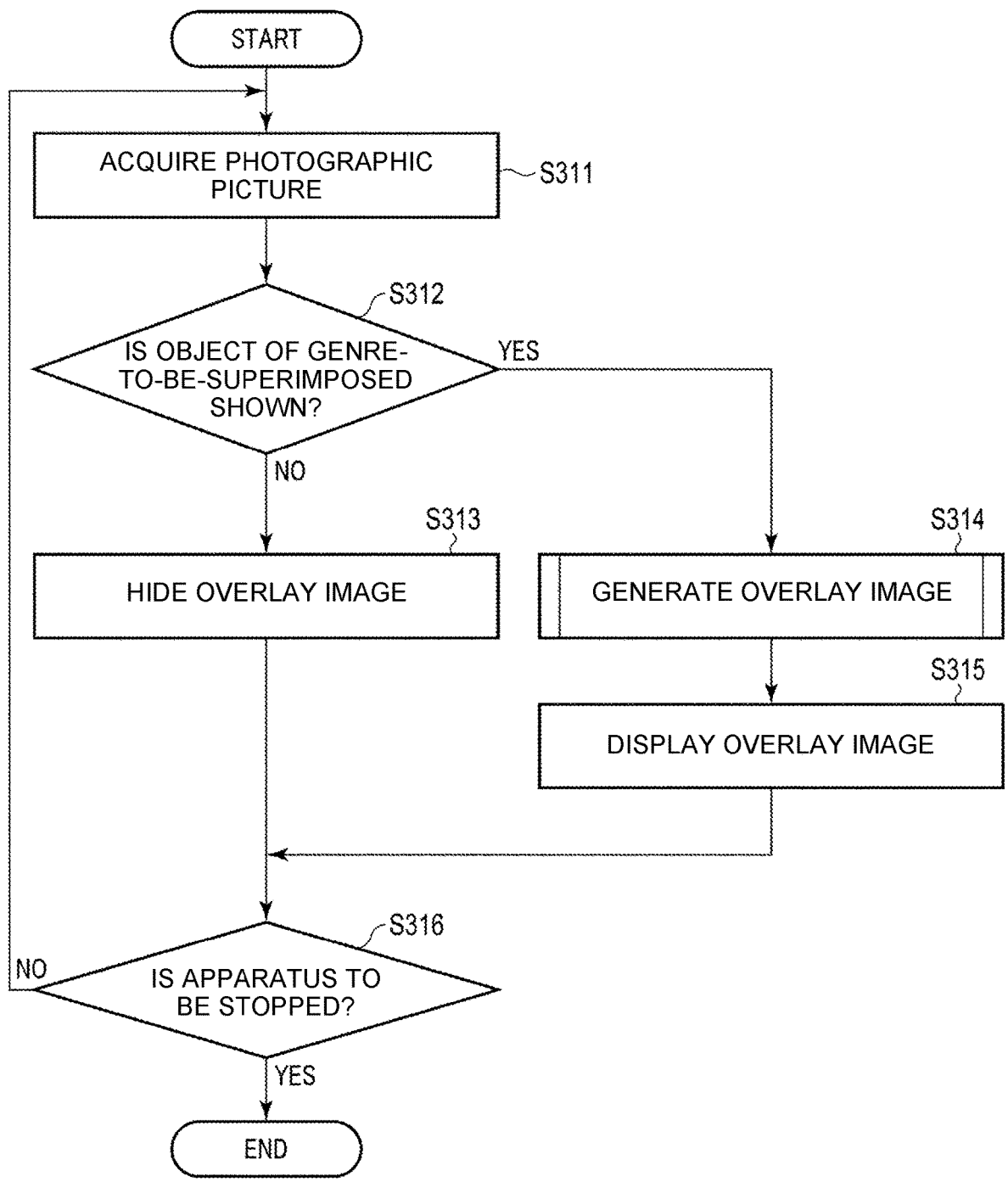
FIG. 26 is a flowchart explaining a process of the display apparatus shown in FIGS. 22 and 23.

A process of the display apparatus 300 will be described below with reference to FIG. 26. Here, it is assumed that the user O of the display apparatus 300 is located in front of the half mirror 312.

First, upon startup of the display apparatus 300, the process goes to step S311.

(Step S311) The camera 314 photographs the half mirror 312 and thereby acquires a photographic picture. The photographic picture taken by the camera 314 includes the mirror image formed on the half mirror 312 and the picture displayed on the display 316. The control unit 354 acquires a photographic picture taken by the camera 314 via the input/output I/F 352. The acquired photographic picture is used by the overlay image generation/evaluation unit 322 as appropriate. Subsequently, the process goes to step S312.

(Step S312) The overlay image generation/evaluation unit 322 acquires information about an object in a genre-to-be-superimposed from the superimposition information DB 324. Here, the object is the user O, i.e., a human being. The overlay image generation/evaluation unit 322 determines whether there is an object of the genre-to-be-superimposed on the photographic picture taken by the camera 314. If the object is not shown, the process goes to step S313. If the object is shown, the process goes to step S314.

(Step S313) The control unit 354 hides the overlay image on the display 316. For that, the control unit 354 supplies the display 316 with display information containing no overlay image via the input/output I/F 352. The display 316 displays a picture according to the supplied picture information. That is, the display 316 displays no overlay image. Subsequently, the process goes to step S316.

(Step S314) The overlay image generation/evaluation unit 322 acquires superimposition information to be superimposed. For that, the overlay image generation/evaluation unit 322 acquires superimposition information corresponding to the object in the genre-to-be-superimposed shown in the photographic picture. The acquisition of the superimposition information is similar to the first embodiment. The overlay image generation/evaluation unit 322 generates an overlay image based on the superimposition model 328 and the photographic picture taken by the camera 314. Details about generation of the overlay image will be described later. Subsequently, the process goes to step S315.

(Step S315) The control unit 354 displays the overlay image generated in step S314 on the display 316. For that, the control unit 354 supplies display information containing the overlay image generated by the overlay image generation/evaluation unit 322 to the display 316 via the input/output I/F 352. The display 316 displays a picture according to the supplied picture information. That is, the display 316 displays the overlay image, i.e., the headphone image. Subsequently, the process goes to step S316.

(Step S316) The control unit 354 determines whether a command to stop the display apparatus 300 has been entered. If a stop command has not been entered, the process returns to step S311. If a stop command has been entered, the process is finished.

Figure 27:
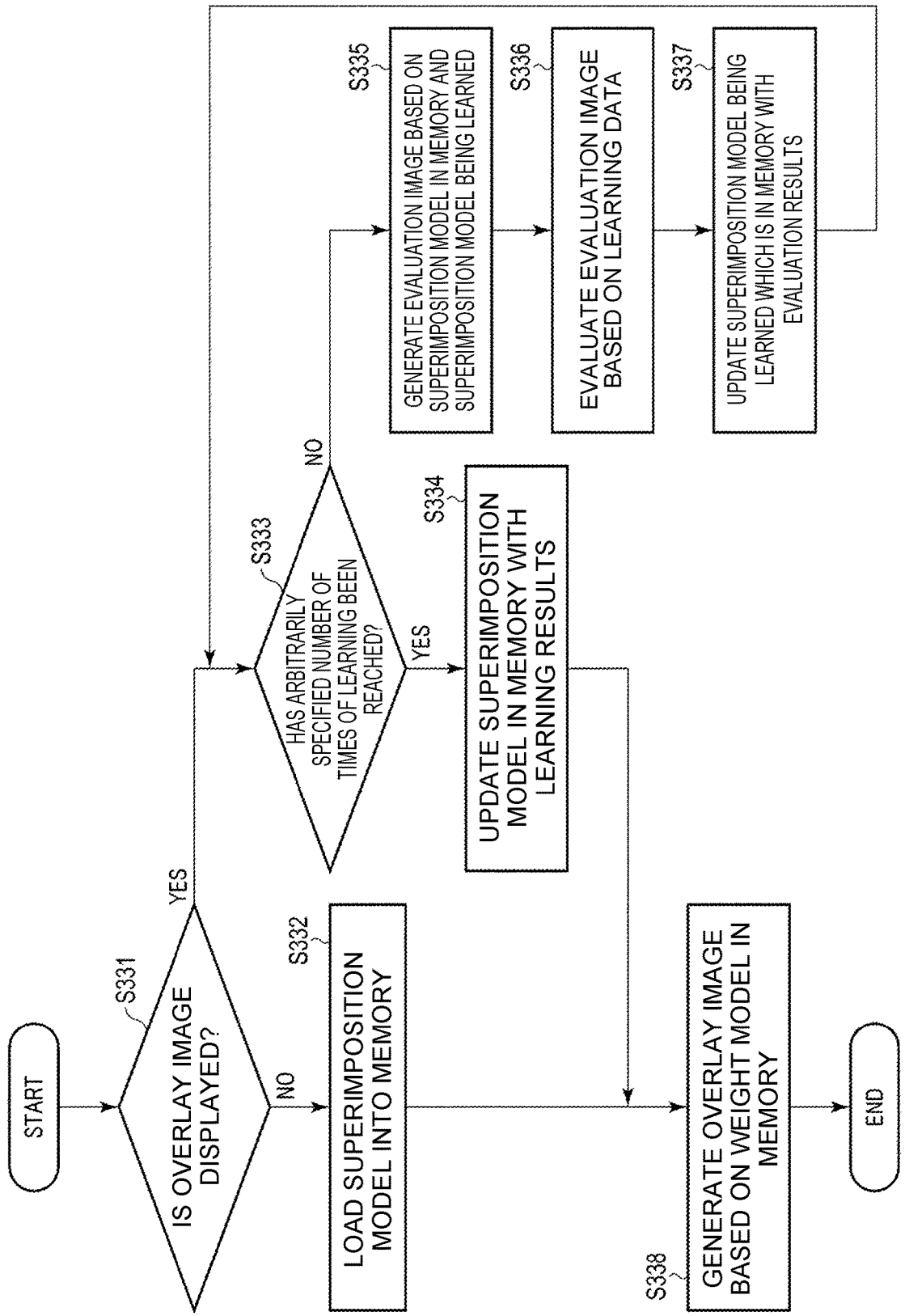
FIG. 27 is a flowchart explaining the generation process for overlay images shown in FIG. 26.

Next, the overlay image generation performed by the overlay image generation/evaluation unit 322 in step S314 will be described with reference to FIG. 27.

(Step S331) It is determined whether an overlay image is displayed. If no overlay image is displayed, the process goes to step S332. If an overlay image is displayed, the process goes to step S333.

(Step S332) The superimposition model 328 is loaded into an internal memory. Subsequently, the process goes to step S338.

(Step S333) It is determined whether an arbitrarily specified number of times of learning has been reached. If the specified number of times of learning has been reached, the process goes to step S334. If the specified number of times of learning has not been reached, the process goes to step S335.

(Step S334) The superimposition model in the internal memory is updated with learning results. Subsequently, the process goes to step S338.

(Step S335) An evaluation image is generated based on the superimposition model in the internal memory and the superimposition model being learned. Subsequently, the process goes to step S336.

(Step S336) The evaluation image is evaluated based on the learning data. Subsequently, the process goes to step S337.

(Step S337) The superimposition model being learned which is in the internal memory is updated with evaluation results. Subsequently, the process returns to step S333.

(Step S338) An overlay image is generated based on the weight model in the internal memory.

The overlay image thus corrected is displayed on the display 316 in step S315. Consequently, as shown in FIG. 24, the headphone image I2A appropriate in size for the mirror image I1A of the user O on the half mirror 312 is superimposed at a position appropriate for the mirror image I1A of the user O.

Consequently, the user O can look at the headphone image I2A superimposed on his/her own mirror image I1A, without feeling anything odd.

Note that the present invention is not limited to the above embodiments, and may be modified in various forms in the implementation stage without departing from the gist of the invention. The embodiments may be implemented in combination as appropriate, offering combined effects. Furthermore, the above embodiments include various inventions, and various inventions can be extracted through appropriate combinations of the disclosed components. For example, even if some of the components are removed from any of the embodiments, the resulting configuration can be extracted as an invention as long as the configuration can solve the problems and provide the advantages.

REFERENCE SIGNS LIST

100 Display apparatus
112 Half mirror
114 Camera
116 Display
122 Overlay image generation unit
124 Superimposition information database
132 Correction processing unit
134 Hardware information
152 Input/output interface
154 Control unit
156 Program storage unit
158 Data storage unit
162 Input unit
200 Display apparatus
212 Half mirror
214 Camera
216 Display
218 Camera
222 Overlay image generation unit
224 Superimposition information database
232 Necessity-of-correction determination unit
234 Correction processing unit
236 Superimposed-state information
238 Correction history database
252 Input/output interface
254 Control unit
256 Program storage unit
258 Data storage unit
262 Input unit
300 Display apparatus
312 Half mirror
314 Camera
316 Display
322 Overlay image generation/evaluation unit
324 Superimposition information database
326 Learning data
328 Superimposition model
336 Learning data
352 Input/output interface
354 Control unit
356 Program storage unit
358 Data storage unit
362 Input unit
I1 Mirror image
I1A Mirror image
I1B Figure
I2 Image
I2A Image
I2B Image

The invention claimed is:

1. A display apparatus that is configured to display a mirror image by superimposing information on the mirror image, the display apparatus comprising:
a half mirror configured to form a mirror image of an object existing in space in front of the half mirror;
a display placed behind the half mirror;
a processor; and
a memory device storing instructions that, when executed by the processor, cause the processor to:
generate an overlay image to be displayed by the display in a size scaled in relation to the mirror image at a position for the mirror image;
photograph space in front of the half mirror;
photograph the half mirror from the front;
maintain superimposition information including the overlay image in memory;
store superimposed-state information and correction history information;
select the overlay image from the superimposition information based on a photographic picture taken by a first camera;
generate the superimposed-state information; and
correct the selected overlay image, based on a photographic picture taken by a second camera.

2. The display apparatus according to claim 1, wherein the display apparatus further comprises:
a camera configured to photograph space in front of the half mirror; and
a data storage unit configured to store superimposition information including the overlay image and hardware information about the half mirror and the camera.

3. The display apparatus according to claim 2, wherein the processor performs operations comprising:
selecting the overlay image from the stored superimposition information based on a photographic picture taken by the camera; and
correcting the selected overlay image, based on the photographic picture taken by the camera and on the hardware information.

4. The display apparatus according to claim 1, wherein the display apparatus further comprises:
a first camera configured to photograph space in front of the half mirror;
a second camera configured to photograph the half mirror from the front; and
a data storage unit configured to keep superimposition information including the overlay image in memory and store superimposed-state information and correction history information.

5. The display apparatus according to claim 4, wherein the processor performs operations comprising:
selecting the overlay image from the superimposition information based on a photographic picture taken by the first camera and generate the superimposed-state information; and
correcting the selected overlay image, based on a photographic picture taken by the second camera.

6. The display apparatus according to claim 1, wherein the display apparatus further comprises:
a camera configured to photograph the half mirror from the front; and
a data storage unit configured to keep in memory superimposition information including the overlay image, learning data for machine learning, and a superimposition model learned using the learning data.

7. The display apparatus according to claim 6, wherein the processor performs operations comprising generating the overlay image by machine learning using a photographic picture taken by the camera, the learning data, and the superimposition model.

8. A display method for displaying a mirror image by superimposing information on the mirror image, the display method comprising:
forming a mirror image of an object existing in space in front of a half mirror using the half mirror;
generating an overlay image to be displayed by a display placed behind the half mirror, in a size scaled in relation to the mirror image at a position for the mirror image;
photographing space in front of the half mirror;

photographing the half mirror from the front;
maintaining superimposition information including the overlay image in memory;
storing superimposed-state information and correction history information;
selecting the overlay image from the superimposition information based on a photographic picture taken by a first camera;
generating the superimposed-state information; and
correcting the selected overlay image, based on a photographic picture taken by a second camera.

9. The display method according to claim 8, further comprising:
photographing space in front of the half mirror;
storing superimposition information including the overlay image and hardware information about the half mirror and a camera;
selecting the overlay image from the superimposition information based on a photographic picture taken by the camera; and
correcting the selected overlay image, based on the photographic picture taken by the camera and on the hardware information.

10. The display method according to claim 8, further comprising:
photographing the half mirror from the front;
maintaining in memory superimposition information including the overlay image, learning data for machine learning, and a superimposition model learned using the learning data; and
generating the overlay image by machine learning using a photographic picture taken by a camera, the learning data, and the superimposition model.

11. A non-transitory computer-readable medium storing software comprising instructions executable by one or more computers which, upon such execution, cause the one or more computers to perform operations comprising:
displaying a mirror image by superimposing information on the mirror image, the operations comprising:
forming a mirror image of an object existing in space in front of a half mirror using the half mirror;
generating an overlay image to be displayed by a display placed behind the half mirror, in a size scaled in relation to the mirror image at a position for the mirror image;
photographing space in front of the half mirror;
photographing the half mirror from the front;
maintaining superimposition information including the overlay image in memory;
storing superimposed-state information and correction history information;
selecting the overlay image from the superimposition information based on a photographic picture taken by a first camera;
generating the superimposed-state information; and
correcting the selected overlay image, based on a photographic picture taken by a second camera.

12. The non-transitory computer-readable medium according to claim 11, further comprising:
photographing space in front of the half mirror;
storing superimposition information including the overlay image and hardware information about the half mirror and a camera;
selecting the overlay image from the superimposition information based on a photographic picture taken by the camera; and
correcting the selected overlay image, based on the photographic picture taken by the camera and on the hardware information.

13. The non-transitory computer-readable medium according to claim 11, further comprising:
photographing the half mirror from the front;
maintaining in memory superimposition information including the overlay image, learning data for machine learning, and a superimposition model learned using the learning data; and
generating the overlay image by machine learning using a photographic picture taken by a camera, the learning data, and the superimposition model.

* * * * *